(12) United States Patent
Wieder

(10) Patent No.: US 6,308,929 B1
(45) Date of Patent: Oct. 30, 2001

(54) MOLD INSERT

(76) Inventor: Klaus A. Wieder, W3877 Scheel La., Helenville, WI (US) 53137

( * ) Notice: Subject to any disclaimer, the term of this patent is extended or adjusted under 35 U.S.C. 154(b) by 0 days.

(21) Appl. No.: 09/177,267

(22) Filed: Oct. 22, 1998

(51) Int. Cl.[7] ................................................. B41B 11/62
(52) U.S. Cl. ............................ 249/103; 249/104; 425/577
(58) Field of Search ................................... 249/103, 104; 425/572, 577, 556, 588; 264/334

(56) References Cited

U.S. PATENT DOCUMENTS

| | | | |
|---|---|---|---|
| 4,137,962 | * 2/1979 | Pol | 164/236 |
| 4,280,976 | * 7/1981 | von Holdt | 264/152 |
| 4,337,027 | 6/1982 | Montieth | 425/562 |
| 4,384,702 | * 5/1983 | Boskovic | 249/103 |
| 4,708,314 | * 11/1987 | Kuhling | 249/103 |
| 4,842,508 | * 6/1989 | Boskovic | 425/468 |
| 4,909,725 | 3/1990 | Ward | 425/562 |
| 4,952,132 | 8/1990 | Lundquist | 425/197 |
| 5,097,864 | 3/1992 | Myers et al. | 137/528 |
| 5,151,282 | 9/1992 | Dray | 425/562 |
| 5,208,053 | * 5/1993 | Vandenberg | 425/572 |
| 5,304,058 | 4/1994 | Gill | 425/562 |
| 5,421,716 | 6/1995 | Gellert | 425/549 |
| 5,435,023 | * 7/1995 | Wagner et al. | 5/270 |
| 5,620,716 | * 4/1997 | Opitz | 425/169 |
| 5,788,872 | * 8/1998 | Uratani | 249/103 |
| 5,817,349 | * 10/1998 | Pruna | 425/542 |
| 5,824,350 | * 10/1998 | Wietrzynski | 425/190 |
| 5,902,512 | * 5/1999 | Streit | 249/103 |

* cited by examiner

Primary Examiner—Nam Nguyen
Assistant Examiner—Emmanuel S. Luk
(74) Attorney, Agent, or Firm—Boyle Fredrickson Newholm Stein & Gratz S.C.

(57) ABSTRACT

An insert for a mold comprising a plug, having an insert face, and a receiver defined by a sidewall with one of the plug and the receiver having a groove that receives a guide that extends from the other of the plug and the receiver so as to facilitate rotation of the plug while opposing withdrawal of the plug. In one preferred embodiment, the groove has an inclined entranceway, that facilitates plug insertion and removal, and a transverse portion and extends circumferentially no more than about one and one-quarter rotation about the plug. In another embodiment, the guide is resiliently urged outwardly from the plug to ride in a groove in the sidewall and the sidewall has an access port for prying free the plug from the receiver. A detent assembly comprised of notches on the plug and a detent carried by the receiver permit the plug to be selectively indexed. The insert can be mounted to or carried by an ejector pin having a head constructed and arranged to prevent rotation of the pin during mold operation. In one preferred pin, a portion of the barrel is machined and hardened before shipment to another location, typically to an end user, where the unmachined portion is cut to length before machining the head and remainder of the barrel.

57 Claims, 12 Drawing Sheets

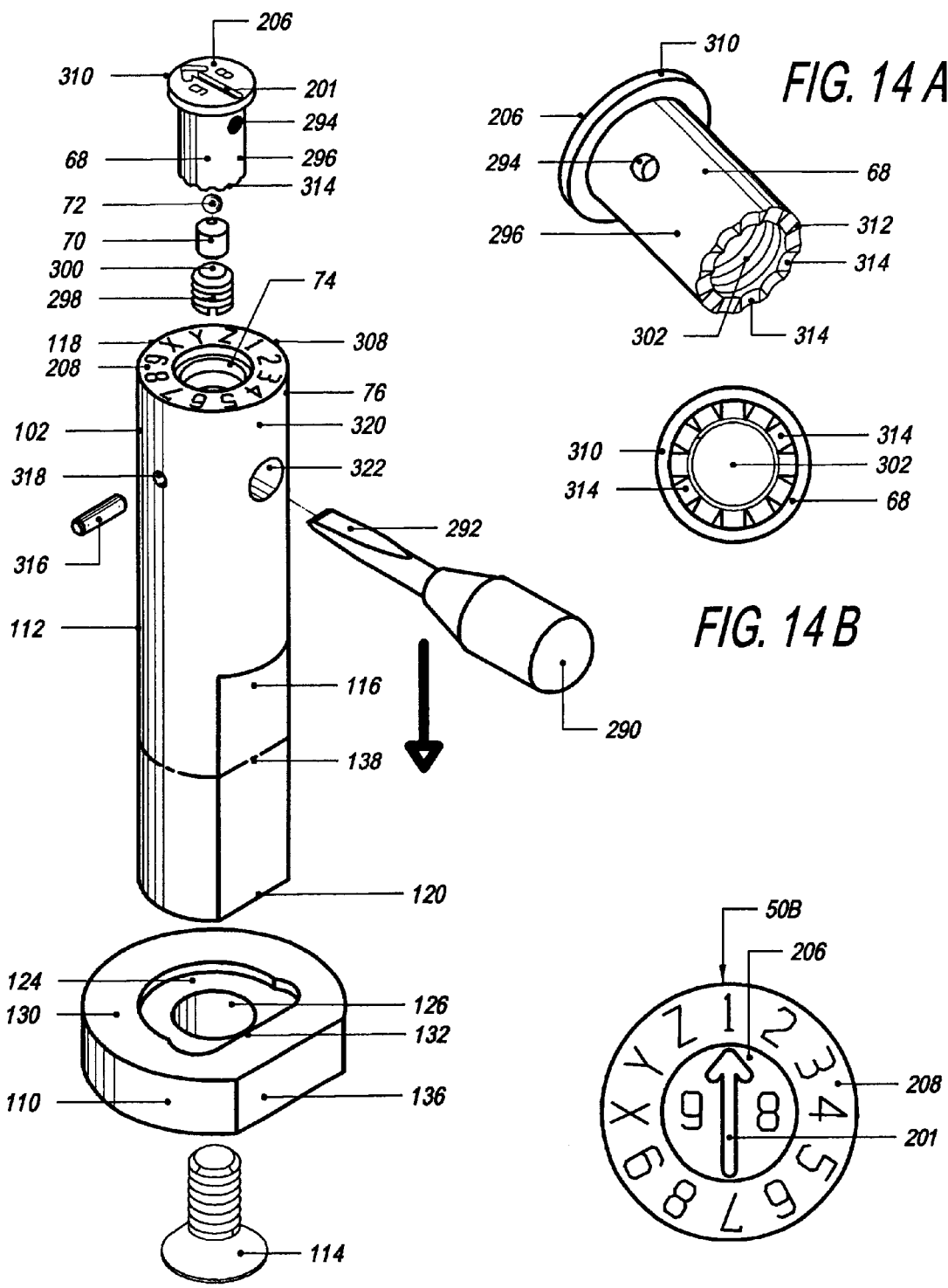

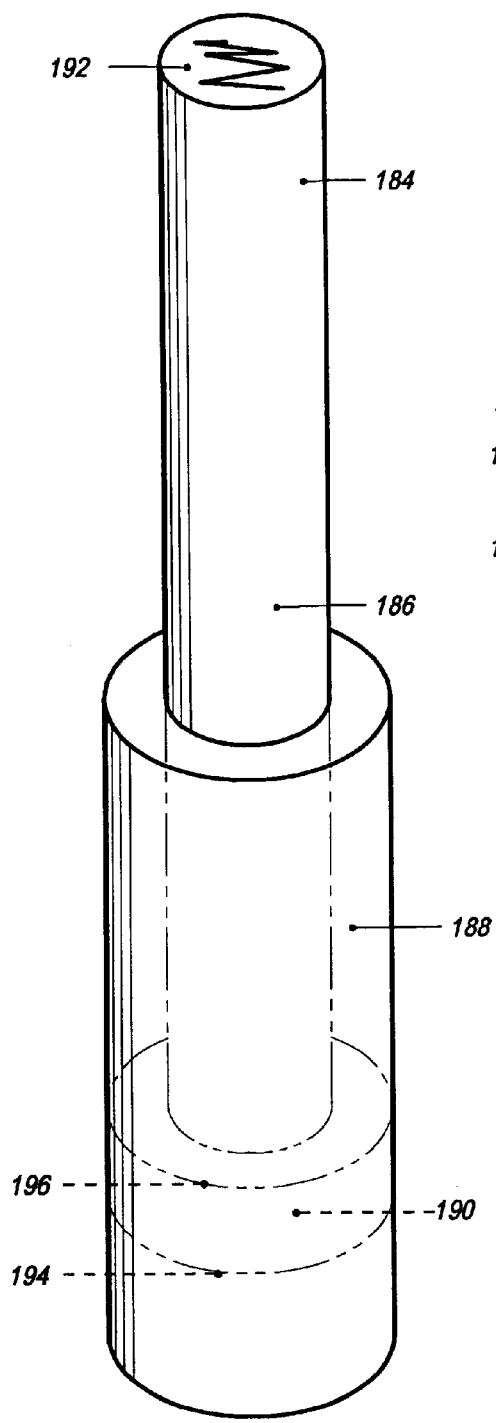
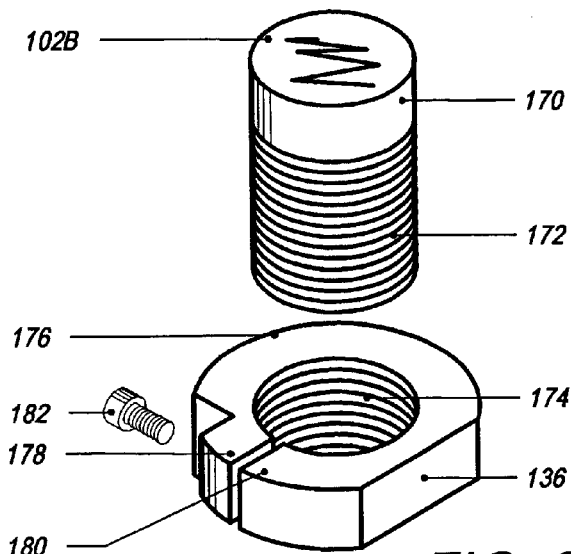
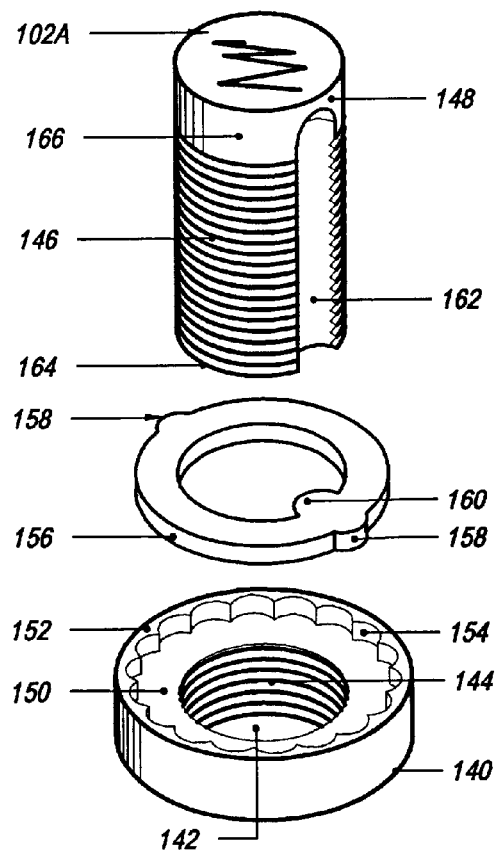
FIG. 23
FIG. 22
FIG. 21

MOLD INSERT

FIELD OF THE INVENTION

The present invention relates to an insert for a mold for affecting a hardenable material in a mold and more particularly to a rotatable insert capable of controlling flow of the hardenable material or imprinting an indicia into the hardenable material.

BACKGROUND OF THE INVENTION

It is common for molds of all kinds to be equipped with multiple mold cavities to increase production. However, not all of the cavities are needed at all times. Thus, a mechanism is needed which can selectively direct flow to one or more cavities or none of the cavities, if desired.

One such mechanism is disclosed in U.S. Pat. No. 5,208,053 and consists of three pieces, a retainer, a core pin and an outer casing. Unfortunately, no provision is disclosed for removing the core pin without knocking out the entire mechanism by inserting a pin or screwdriver through a bore in the backside of the mold against the retainer. Such a process is time consuming which, in turn, increases mold down time, which is very costly. Moreover, only four core pin positions are disclosed, limiting the number of flow options available. Finally, the mechanism is of no use in throttling flow to a particular cavity. When the core pin is disposed in one position, a pin disposed between the retainer and core pin prevents rotation of the core pin. To rotate the core pin to redirect flow, the pin must be pushed into the retainer which is time consuming and difficult. Such an insert is also ill-suited for imprinting an indicia, such as the date, time and material type into the hardenable material.

What is needed, therefore, is a rotatable mold insert that can be quickly and easily removed or inserted. What is further needed is an insert that can be quickly, easily, and precisely indexed. What is also needed is an insert that can accommodate any kind of insert including, for example, flow-directing inserts and indicia-imprinting inserts. What is still further needed is an insert that is versatile and capable of different functions. What is still further needed is an insert that can be carried by or mounted to one end of an ejector pin.

OBJECTS AND SUMMARY OF THE INVENTION

An insert for a mold for diverting flow of a hardenable material or imprinting an indicia into the hardenable material wherein the insert comprises a plug that is rotatable and which can be quickly and easily removed, when needed, and replaced, if desired. In operation, while the mold halves are separated, the plug can be rotated using a tool, such as a screwdriver, to the desired setting. During mold operation, the plug has an insert face that can have, for example, one or more flow directing channels or an indicia that is imprinted into the hardenable material.

The plug has an outer axial face that is in contact with the hardenable material. The plug has a body that preferably is generally cylindrical, includes a larger head carrying the insert face, and which is received in a receiver that preferably comprises pocket formed by a sidewall. The pocket preferably is formed in one of the mold halves, an ejector pin, another mold component, or a removable cup. A rotating mechanism operably cooperates with the plug and the receiver such that the plug is rotatable and preferably indexable.

In one preferred embodiment, one of the plug and the receiver has a groove that receives a guide that extends from the other of the plug and the receiver so as to facilitate rotation of the plug while opposing withdrawal of the plug. The guide is a protrusion that preferably comprises a pin or a ball.

The guide is a locator that is urged toward the groove. For example, the guide can be urged radially toward the groove by a pin, a finger, or a spring. The finger preferably comprises a leaf spring or beam spring anchored by a fastener. The finger preferably is a coil spring retained by a screw or bolt. The spring can comprise a spring plunger or the like.

In one preferred embodiment, the groove extends about the circumference of the plug and is contoured so as to accept the guide. The groove has a transverse portion and an entranceway that is inclined relative to the transverse portion. The entranceway is constructed and arranged to accept the guide to facilitate fast and easy insertion of the plug into the receiver and removal of the plug from the receiver.

In its preferred embodiment, the groove is comprised of a single transverse portion and a single entranceway. The transverse portion extends no more than about one revolution about the plug and the entranceway extends less than one revolution about the plug. Preferably, the entranceway is inclined at an acute angle relative to the transverse groove portion. In one preferred groove embodiment, the groove is at least about 0.040 inches wide, preferably at least 0.070 inches wide, and at least about 0.020 inches deep, its transverse portion extends between about 250° and about 330° around the plug body, and its entranceway is inclined at an angle of between about 20° and about 40°. Preferably, the entranceway extends between about 40° and about 60° around the plug body. Preferably, the entranceway and transverse portion extend at least about two-thirds of a revolution about the body and no more than about 300° about the body.

So that the plug can be rotated to one of a number of predetermined positions, the head of the plug has a shoulder, formed where the plug diametrically necks down to the body, that cooperates with a detent assembly. The detent assembly preferably comprises a plurality of circumferentially spaced apart notches in an axial surface of the shoulder that cooperate with one or more detents in the pocket. The detent preferably is a pin or a ball that can be resiliently biased toward the shoulder to facilitate ease of rotation and indexing.

To rotate or remove the plug from the pocket, a tool, such as a blade of a screwdriver, engages the face of the plug head to rotate the plug. To remove the plug, the plug is rotated in one direction until the guide reaches the entranceway. Further rotation in the one direction causes the guide to ride further along the entranceway until it reaches the mouth or opening of the entranceway thereby freeing the plug completely from the pocket. As the guide rides along the entranceway, the angle of the entranceway displaces the plug such that its face is no longer flush with the mold, cup or ejector pin carrying the plug so that it can be manually removed.

In inserting the plug, the plug is dropped into the pocket and rotated in the opposite direction until the guide enters the mouth of the entranceway. Further rotation causes the guide to ride along the entranceway until the plug completely retracts into the pocket such that the face is flush with the mold, the ejector pin, or the cup carrying the plug. Further rotation causes the guide to traverse from the entranceway to the transverse portion.

In another preferred embodiment, the plug has a protrusion that registers with a groove in the inner sidewall that forms the pocket. Preferably, the protrusion is a ball that is biased outwardly from the plug body by a wad received within a hollow in the body. The wad preferably is comprised of an elastomeric material or another resilient synthetic or natural material. A cap or core at one end of the plug body engages the body to retain the wad within the plug. In its preferred embodiment, the cap is a screw or bolt.

The head of the plug is received in a complimentary recess in the pocket. Preferably, the recess is configured so as to receive the head such that the outer axial face of the head is substantially flush with the surrounding mold or cup.

So that the plug can be selectively indexed, a detent mechanism or assembly cooperates with the plug. The detent mechanism comprises a detent carried by the mold, the pin or the cup that cooperates with at least one of a plurality of detent notches in the axial end of the plug body. In its preferred form, the detent comprises a pin or ball that extends generally radially inwardly into the pocket.

To facilitate removal of the plug, there is an access port in the sidewall. A tool is inserted through the port where it is used to pry the plug upwardly relative to the pocket so it can be grasped and removed.

Where a cup is used, the cup has an endwall and an endless sidewall that preferably is cylindrical to form a cylindrical pocket. The cup can be received in its own pocket in the mold that can comprise a bore or an indention in the mold. Where disposed in its own pocket, a fastener secures the cup to the mold. The endwall has a bore through which the fastener is inserted such that it is received in a threaded bore in the mold. The bore in the endwall is threaded and larger than the bore in the mold so the fastener can be removed and a jackscrew inserted to remove the cup from its pocket when it is desired to remove the cup.

An insert of this invention can be mounted to or carried by an ejector pin. The ejector pin includes a removable head and a barrel that can be cut to the desired length for the mold into which it is to be assembled. In one preferred mounting arrangement, the head has a recess with a locator, preferably a flat, that receives a complementary end of the barrel. The end of the head has a bore that receives a fastener that threads into the barrel to mount the head to the barrel. The head has a locator, preferably a flat, that registers with a complementary locator of an ejector plate assembly of the mold to keep the ejector pin from rotating during mold operation. By preventing pin rotation, circumferential or angular location of the outer axial face of the insert is maintained during mold operation.

In another ejector pin embodiment, the end of the barrel is threaded and threadably received in a threaded bore in the head. In one preferred head arrangement, the head can be generally U-shaped having a pair of arms separated by a gap that is closed to clamp the arms around the barrel when a fastener engages both arms. When assembled, the head preferably is incapable of rotating relative to the barrel.

In another preferred head arrangement, the head has an axially extending locator groove in the threaded end that receives a radially inwardly extending locator of a locator ring or washer that is received in a recess in the head. The ring has at least one and preferably a plurality of circumferentially spaced apart locators that are received in locator notches of the recess. When assembled, the ring prevents the barrel from rotating relative to the head.

In still another preferred ejector pin embodiment, the pin is partially formed and completed at a remote location that can be, for example, where the mold is located, a mold manufacturing plant, a distributor, or an end user. The pin is partially finished from a blank that preferably is bar stock or round stock partially machined to form at least a portion of the barrel. The outer surface of the barrel is hardened by a hardening process such as shot peening, nitriding, or another suitable hardening process.

In finishing the pin, preferably after shipment to the remote location, the length of the pin is selected and the unmachined portion is machined to form the head. Typically, a portion of the unmachined portion is cut to cut the pin to the desired length before the head and remainder of the barrel are machined.

If desired, a locator, such as a locator flat or the like, can be machined into the head to keep the head and barrel from rotating during operation. If desired, an insert can be mounted to the end of the barrel opposite the ejector pin head.

Objects, features, and advantages of the present invention include a mold insert that is easy to install in a mold; is easily removed; is quick and easy to rotate; is quick and easy to change; minimizes mold downtime; can be installed on an ejector pin; and is an insert that is rugged, simple, flexible, reliable, and durable, and which is of economical manufacture and is easy to assemble, install, and use.

Objects, features, and advantages of the present invention include an ejector pin that is easy to install in a mold; maintains location of an insert mounted thereto; is efficient to manufacture because it is cut to length after initial manufacture; and is an ejector pin that is rugged, simple, flexible, reliable, and durable, and which is of economical manufacture and is easy to assemble, install, and use.

Other objects, features, and advantages of the present invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

At least one preferred exemplary embodiment of the invention is illustrated in the accompanying drawings in which like reference numerals represent like parts throughout and in which:

FIG. 13 shows a still further plug arrangement;

FIG. 14A illustrates a perspective end view of the plug shown in FIG. 13;

FIG. 14B illustrates a bottom view of the plug;

FIG. 14C illustrates a top view of the top surface of the insert;

FIG. 21 is a perspective view of another preferred ejector pin embodiment illustrating a novel mounting arrangement for mounting the barrel to a head to form the pin;

FIG. 22 is a perspective view of a still further preferred embodiment of an ejector pin illustrating a still further mounting arrangement; and FIG. 23 is a perspective view of still another preferred ejector pin embodiment.

DETAILED DESCRIPTION OF THE PREFERRED EMBODIMENT

I. Introduction

FIGS. 1–4 depict a mold 40 having a plurality of cavities 42, 44, 46, and 48, and a plurality of inserts 50a–50c and 52a–52c of this invention for controlling the flow of material 53 (FIG. 3) being communicated to one or more of the cavities 42, 44, 46 and 48 and for imparting an indicia to material 53 in one or more of the cavities 42 and 44 as the material 53 in the cavities 42 and 44 hardens. Each insert 50 and 52 includes a rotating mechanism to enable it to rotate relative to the mold 40. Each insert 50 and 52 preferably is indexable to certain positions to control or divert flow or to select a particular indicia to imprint into the hardenable material 53 in the mold cavity.

Figure 5:
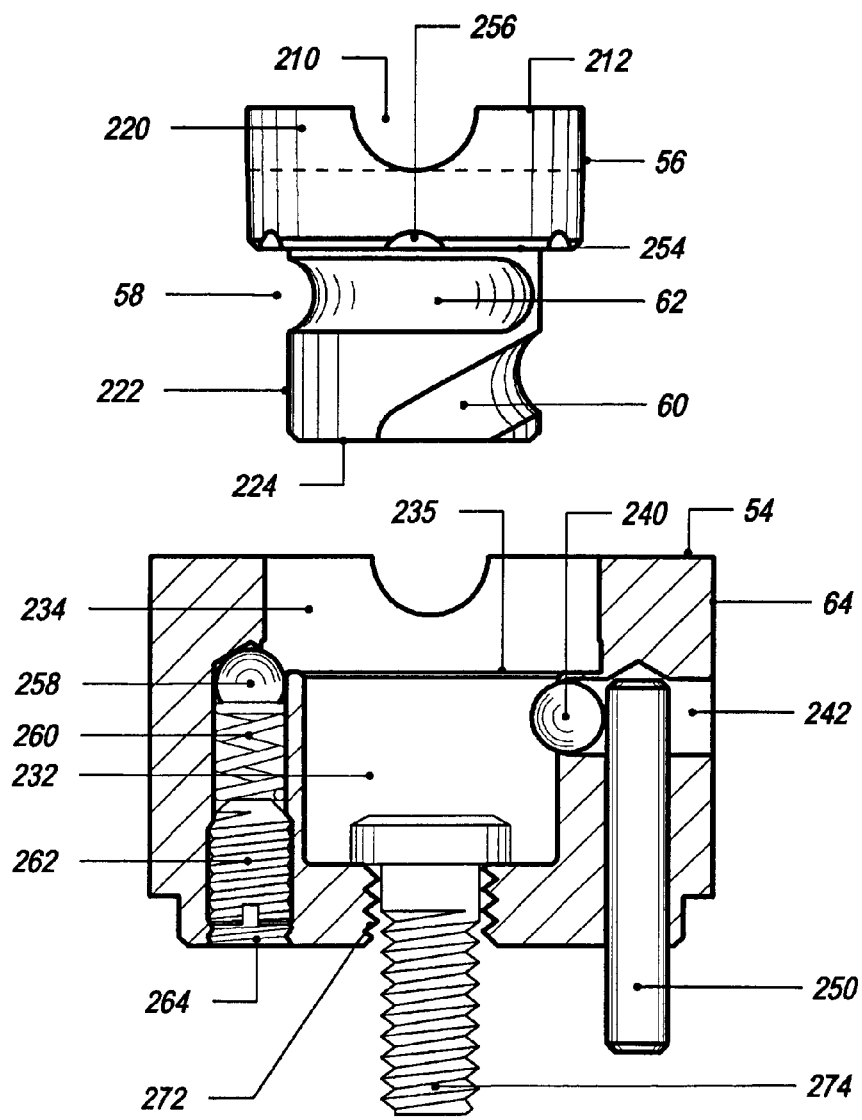
FIG. 5 is an enlarged view of the insert shown in FIG. 4.

Referring to FIG. 5, one preferred rotating mechanism 54 has a plug 56 with a circular groove 58 that is received in a receiver that, in this instance, comprises a cup 64. The groove 58 has a helical portion 60 that enables the insert to be easily removed when rotated beyond a certain point. The groove 58 also has an axial or transverse portion 62 that enables the insert 50 or 52 to be rotated relative to the cup 64.

Another preferred rotating mechanism 66 has a plug 68 that utilizes a biasing element 70 that outwardly urges a locator 72 that rides in an internal groove 74 in a cup 76 that helps retain the plug 68 in the cup 76 while allowing it to rotate relative to the cup 76.

Preferably, each rotating mechanism 54 and 66 can be constructed with at least a plurality of circumferentially spaced apart detents so the plug and insert carried by the plug can be selectively indexed to certain settings when rotated.

II. Mold Construction

Figure 1:
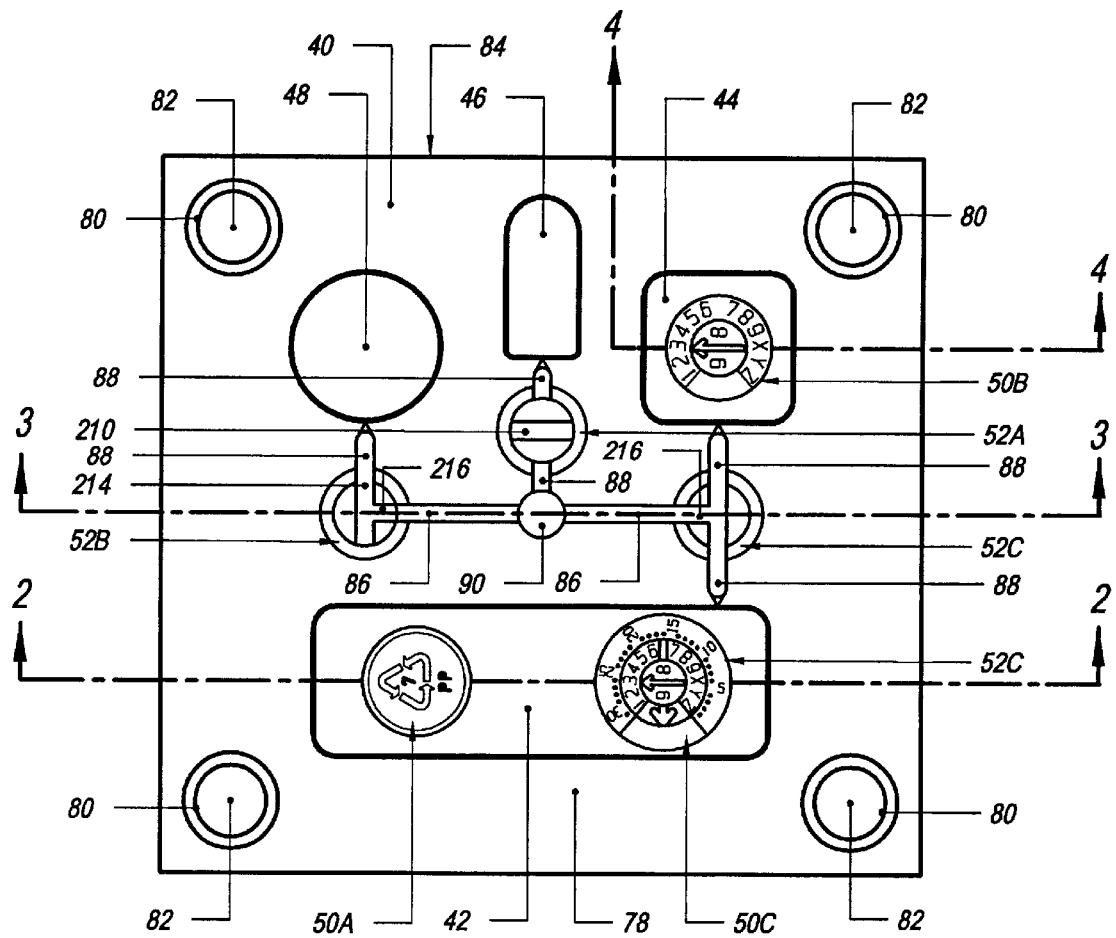
FIG. 1 illustrates a top view of a mold having a plurality of displaceable inserts of this invention carried by the mold.

One portion of an exemplary mold 40 is shown in FIG. 1. The mold portion preferably is a mold half 84 having an exterior mold cavity surface 78 with at least one recess or cavity 42, 44, 46 or 48 for receiving a material 53 that preferably is a liquid but which is hardenable. The mold 40 has another portion, preferably another mold half, that also has an exterior mold cavity surface that can have one or more recesses that are mold cavities. One or both mold halves preferably has a plurality of locator bores 80 each for receiving a guide pin 82 that accurately locates one mold half 84 relative to the other mold half such that when the mold halves are brought together they accurately mate or register with one another.

In the exemplary mold half 84 shown in FIG. 1, one of the cavities 44 has a single insert 50b for imprinting on material 53 within the cavity 44 as it hardens the day and year of molding. Another of the cavities 42 has a pair of the indicia-imprinting inserts 50a and 50c each for leaving an imprint or imprinting an indicia on the exterior of an object being molded in the cavity 42.

So that the material 53 can reach each mold cavity 42, 44, 46, and 48, there is a runner 86, that serves as a supply channel, that is connected to individual feeder channels, referred to as subrunners 88, each of which leads to a cavity. One or both mold halves has an sprue puller 90 that leads from a source of the flowable material 53 preferably to the supply channel 86.

As is shown in FIG. 1, one or more of the channels 86 and 88 can have an insert 52, referred to as a flow diverter, that is constructed and arranged to control flow through the channel. One of the flow controlling inserts 52c is located in the supply channel 86 where it branches to a pair of the feeder channels 88. The flow control insert 52c can be rotated to completely block flow through both feeder channels 88, block flow through any one of the feeder channels 88, permit flow through either feeder channel 88, or permit flow through both feeder channels 88.

Another of the flow controlling inserts 52a, referred to as a runner flow shutoff, is disposed in one of the feeder channels 88 for blocking or allowing flow through the channel 88. If desired, the runner flow shutoff insert 52a can be disposed in one of the supply channels 86.

Figure 2:
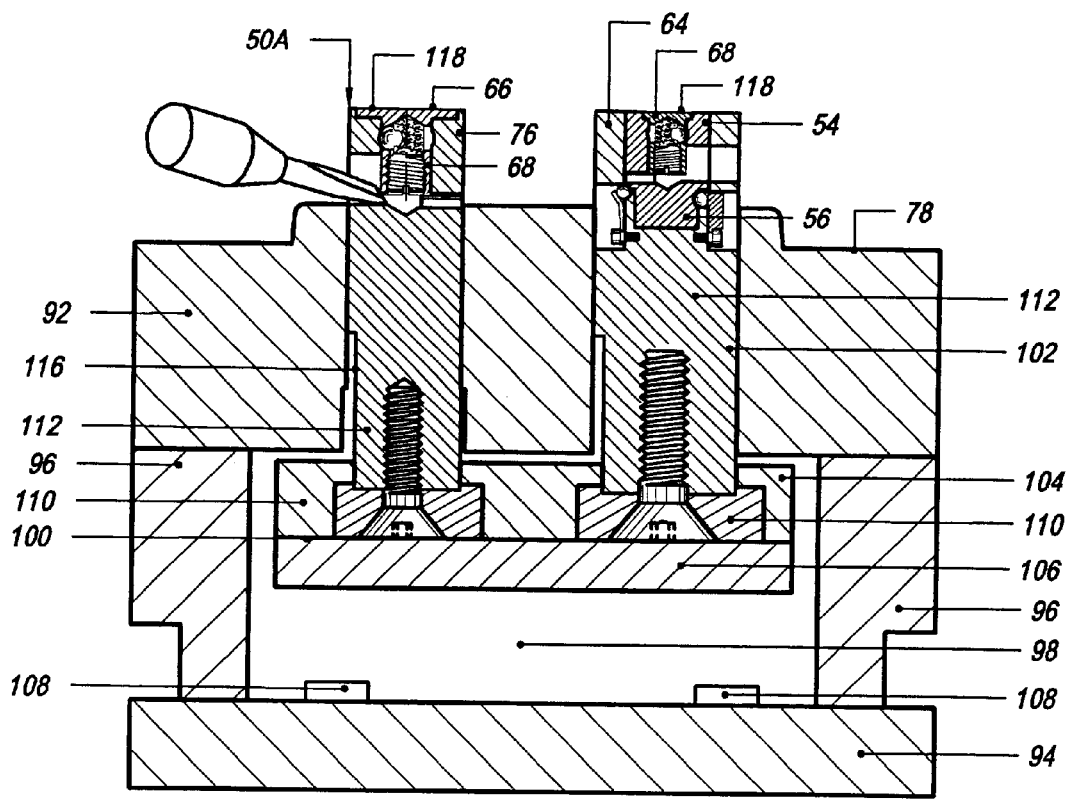
FIG. 2 illustrates a cross sectional view of the mold taken along line 2—2 of FIG. 1 depicting a pair of the inserts each carried by an axially displaceable pin.
Figure 4:
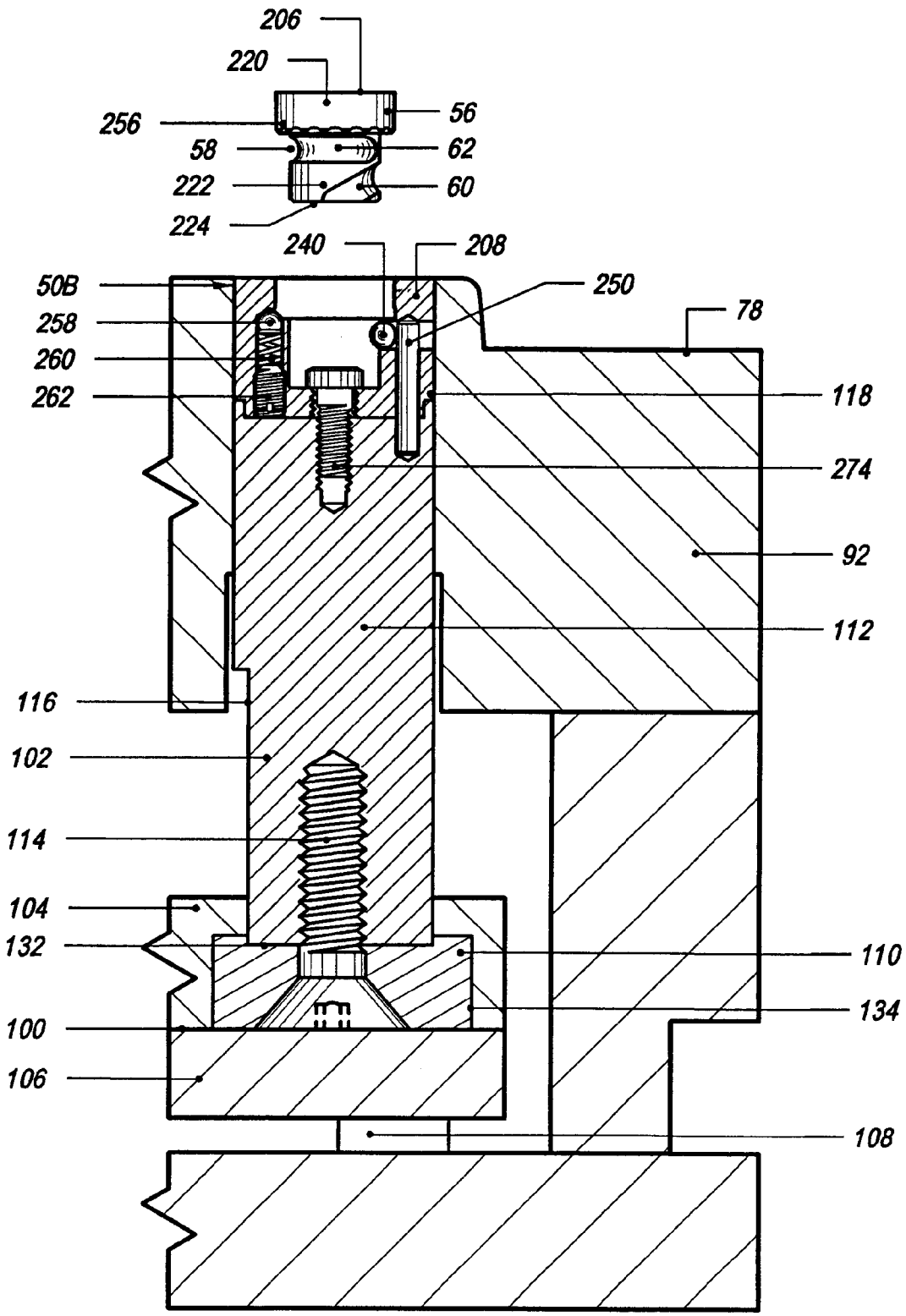
FIG. 4 illustrates a partial fragmentary cross sectional view of the mold with a plug of a first preferred embodiment of an insert exploded for clarity.

Referring to FIGS. 2 and 4, the mold 40 has a body 92 carrying the top mold cavity surface 78, a lower clamp plate base 94 and a pair of risers 96 (sidewalls) supported on the base 94 which in turn supports the mold body 92. The mold body 92, sidewalls 96 and base 94 define therein an ejector chamber 98 in which is located an ejector plate assembly 100. The ejector plate assembly 100 is coupled to at least one ejector pin 102 of this invention.

Figure 3:
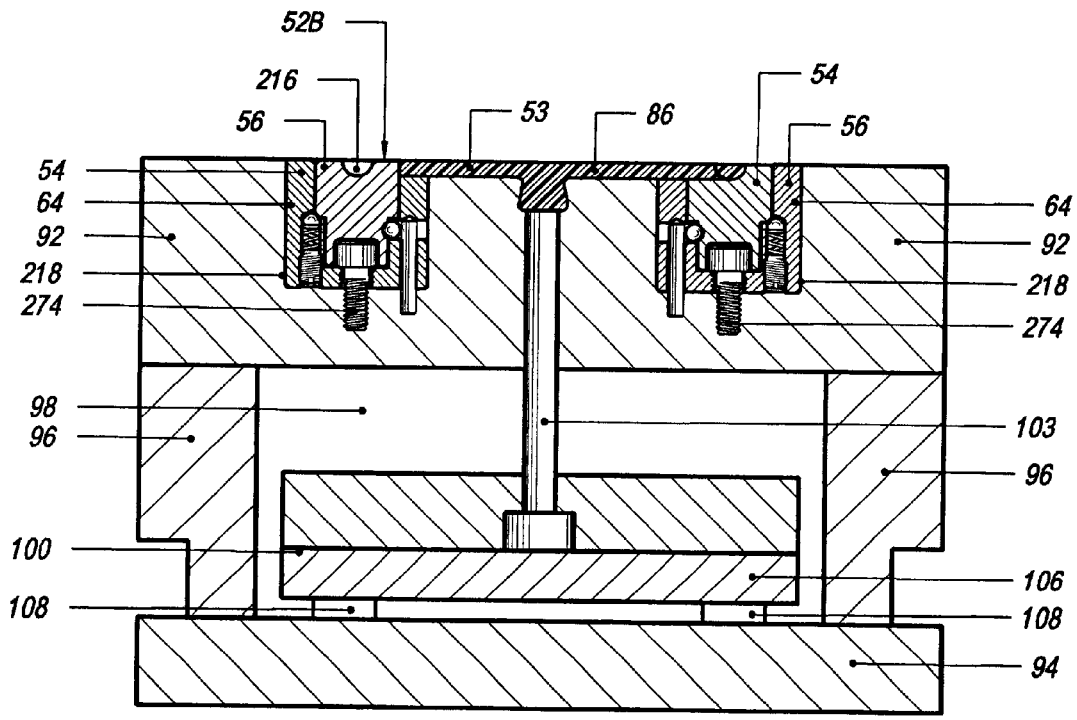
FIG. 3 illustrates a cross sectional view of the mold taken along line 3—3 of FIG. 1 depicting another pair of the inserts each carried by a body of the mold.

Referring to FIG. 2, the ejector plate assembly 100 has an upper ejector plate 104 and a lower backing plate 106 that are fastened together capture one end of each of the ejector pins 102 such that each ejector pin 102 moves substantially in unison with the plates 104 and 106. The opposite end of each ejector pin 102 is slidably telescopically received in a bore in the mold body 92. FIG. 3 shows a conventional ejector pin 103 of one-piece, unitary construction. A pair of spaced apart stops 108 are shown in FIG. 2 carried by the base 94 within the chamber 98 for preventing the backing plate 106 from bottoming out directly against the base 94.

The plates 104 and 106 are preferably connected to prime mover that can be a lift or a cylinder, such as a hydraulic cylinder or gas cylinder (not shown). During operation, the plates 104 and 106 and pins 102 are raised after the material 53 in the mold cavity associated with the pin or pins has suitably hardened. When the pins are raised, the free end of each pins bears against the hardened material 53 in the mold to eject it from the mold so it can be removed.

The mold 40 shown in the drawing figures is an exemplary mold. The novel inserts 50 and 52, rotating mechanisms 54 and 66, and injector pins 102 disclosed herein are capable of being used with other mold configurations, with other types of molds, and in other types of molding environments.

Ejector Pin

As is shown in FIG. 2, one of the inserts is mounted to the end 118 of each ejector pin 102. Of course, the ejector pin 102 of this invention can be used with no insert.

Each pin 102 is constructed of a strong and resilient material, that can be a metal, a composite, a polymeric material, a thermoset material, or another suitable material. Preferably, each pin 102 is constructed of steel that preferably is a stainless steel, such as surface hardened H13 steel, or the like.

As is shown in FIG. 2, each pin 102 of this invention has a head 110 at one end that is mounted to an elongate barrel 112. The head 110 is preferably mounted to the barrel 112 by a fastener 114, such as a screw or a bolt, that is extends through a bore 126 (FIG. 9A) in the head and which is threadably received in a threaded bore 128 in the end 120 of the barrel 112.

Figures 7, 8:
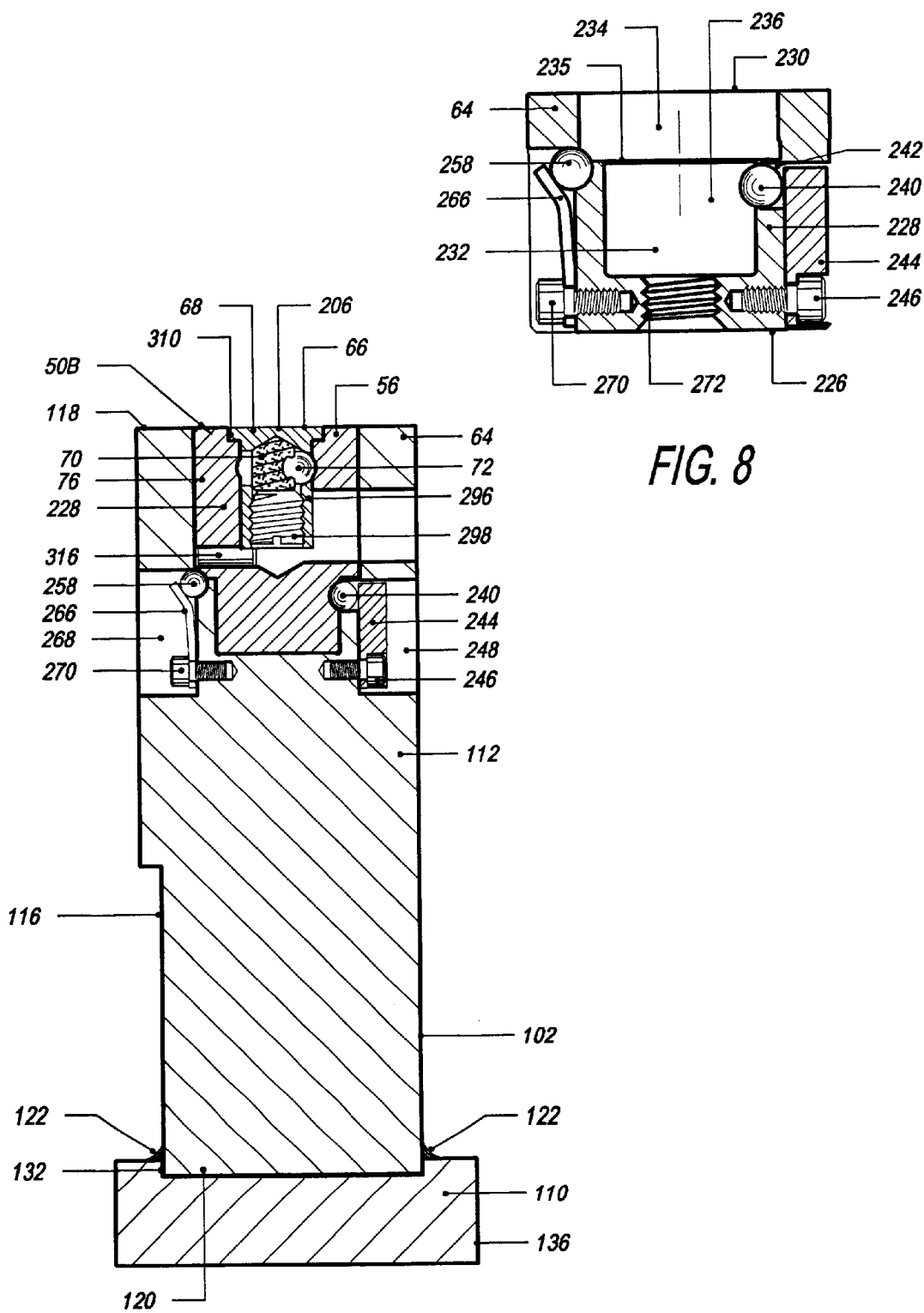
FIG. 7 illustrates a second preferred embodiment of an insert carried by one of the pins.
FIG. 8 illustrates a sleeve of the insert for receiving the insert plug.

For example, the fastener 114 can be a cap screw, set screw, a machine screw, or the like. If desired, the head 110 can be mounted using another type of fastener or fastening method. For example, a fastener that is an adhesive, such as a glue, solder, or another adhesive material can be used to mount the head 110 to the barrel 112. If desired, the head 110 can be fastened to the barrel 112 by another fastener that is a weld 122 (FIG. 7). Such a weld 122 can be created using any suitable welding process including arc welding, friction welding, inertia welding, friction welding, laser welding, electron beam welding, or the like. If desired, the head 110 can be fastened to the barrel 112 by a friction fit, an interference fit, or the like.

Figures 9A, 10:
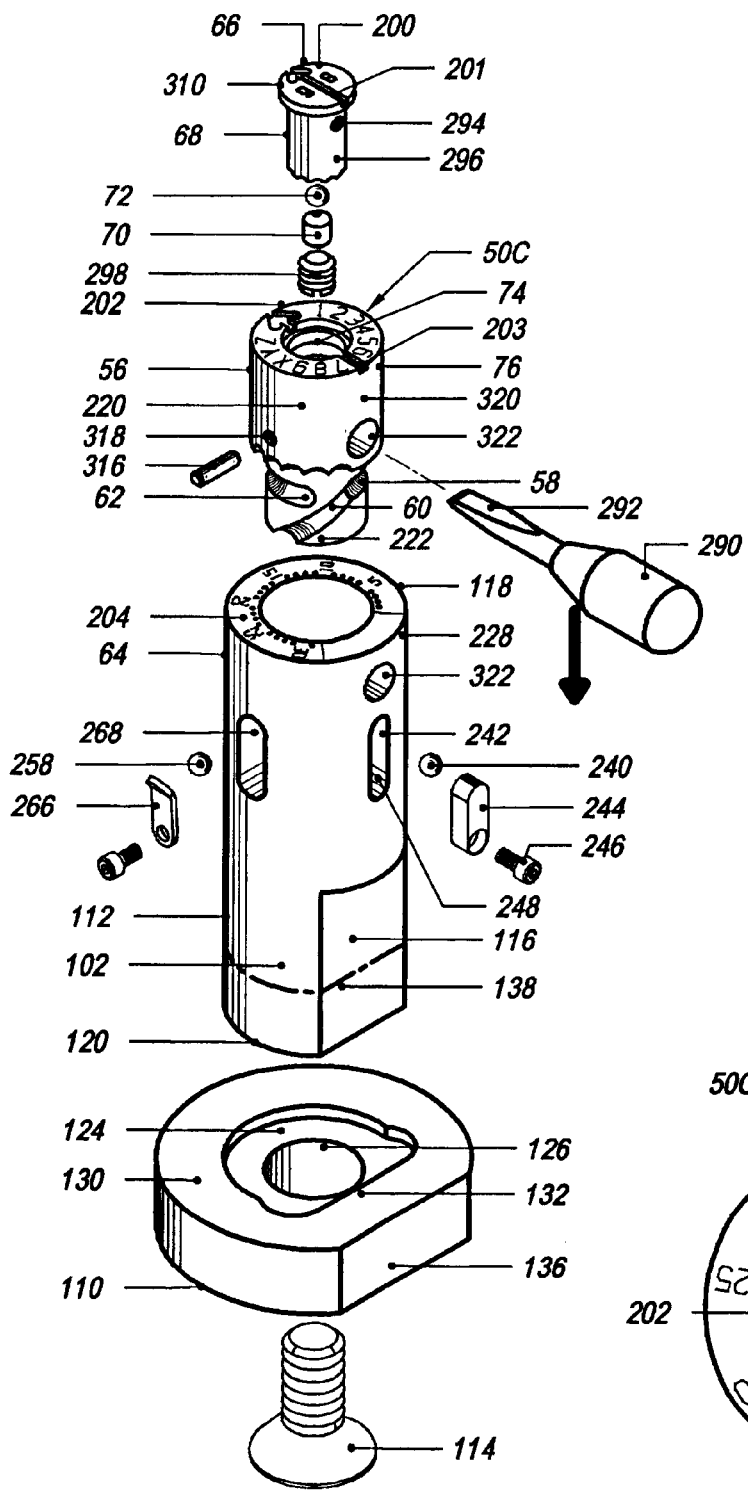
FIG. 9A illustrates a third preferred embodiment of the insert.
FIG. 10 illustrates a top surface of the insert plug shown in FIGS. 9A–9C for imparting an indicia to the hardenable material in contact with the top surface.

Referring to FIG. 9A, the barrel 112 of the pin 102 preferably has a locator flat 116 at its end 120 opposite its free end 118. The head 110 has a recessed land 124 that, in turn, defines an upraised sidewall 130 that is substantially complementary to the cross sectional shape of the barrel end 120. In the preferred embodiment shown in drawing FIGS. 4, 11, and 15, for example, the bore 126 in the head 110 extends completely through the head 110. To threadably receive the fastener 114, the bore 128 in the end 120 of the barrel 112 preferably is internally threaded but can be unthreaded, or have radially inwardly extending axial or radial ridges, or the like.

The sidewall 130 around the recessed land 124 has a locator 132 against which the locator 116 of the barrel 112 bears when the barrel 112 is inserted into the recessed land 124. Preferably, the locator 132 is a flat in an inner radial portion of the sidewall 130.

When the barrel 112 is mated to the head 110, the locator 116 if the barrel 112 registers with the locator 132 of the head 110. The locators 116 and 132 and recessed land 130 help radially center the barrel 112 on the head 110. The locators 116 and 132 also help circumferentially locate the barrel 112 relative to the head 110 so the axially outermost surface of an insert mounted to the barrel 112 is desirably located or oriented relative to the mold cavity within which it is received. The locators 116 and 132 still further prevent relative rotation between the head 110 and barrel 112 so that the insert maintains its desired angular location or orientation during mold operation.

When assembly is completed, the head 110 and barrel 112 form an ejector pin 102 of this invention that behaves as a pin 103 (FIG. 3) of one-piece, integral and unitary construction. When assembly is completed, the head 110 and barrel 112 form a pin 102 of this invention that advantageously functions as a pin 103 of one-piece construction.

As is shown in FIGS. 2 and 4, the head 110 of each pin 102 is captured between the upper ejector plate 104 and the lower ejector plate or lower backup plate 106. The upper ejector plate 104 has a recess complementary to the shape of the head 110 for receiving and locating the head 110. The upper plate 104 also has a bore through which the barrel 112 of the pin 102 projects. The upper plate 104 also includes a locator 134 that registers with an outer locator 136 of the pin head 110. Preferably, the outer locator 136 is a flat portion in the exterior of the sidewall 130. Preferably, the locator 134 in the ejector plate 104 is a flat portion that is complementary to locator 136.

When assembled between the ejector plates 104 and 106, the pin 102 moves in unison with the plates 104 and 106. As a result of the locators 134 and 136 registering with each other, the pin 102 will not rotate relative to the plates 104 and 106 or the mold 40 during operation. By this advantageous construction, the pin 102, and any insert 50 carried by the pin 102, also cannot rotate thereby maintaining the angular location of any insert 50 carried by the pin 102.

Referring to FIG. 9A, the barrel 112 of the pin 102 can be cut, such as along phantom line 138, to accommodate the mold 40 into which it is to be assembled. This enables the barrel 112 of the pin 102 to be of a standard length that is cut to the desired length for the type or size of mold into which it is to be installed. Of course, as is depicted in FIG. 9A, the desired length of the pin 102, denoted by phantom line 138, typically is shorter than the standard barrel length.

In this manner, the ejector pin 102 of this invention can be assembled of standard length and size components and cut to the length required by the specific mold into which it is to be assembled before its assembly into the mold. This can be done prior to shipment or after shipment of the pin 102, by an end user. An example of such an end user can be a mold maker, or a user or operator of the mold.

This also enables a pin 102 with an insert 50 to be manufactured as an assembly, such as is shown in FIGS. 2, 3 and 7, prior to its installation into a mold 40. Even with an insert 50, the barrel 112 can be cut to size by either a mold-maker or an operator or user of the mold. So that the pin 102 can be used with molds of many different types and sizes, the locator surface 116 preferably is at least about two inches long. For pins 102 having a diameter of at least about one-quarter inches, the locator surface 116 is even longer and preferably is at least about four inches long.

The barrel 112 can be cut in any manner. For example, an abrasive cutting method can be used, such as a saw, a wire EDM, a lathe, or another cutting process. If desired, a laser, oxyacetylene, or the like can be used. If desired, another nonabrasive cutting or material removal method can be used. Preferably, the barrel 112 is cut such that the cut end is generally flat so that the axis of the barrel 112 is generally perpendicular to the lengthwise direction of the head 110 when assembled thereto. Preferably, the barrel 112 is cut such that its end is substantially square with the head 110.

In one preferred method, the desired length of the pin 102 is determined and the barrel 112 is marked with a cut line 138 such that the pin 102 will have the desired length when the head 110 is assembled. Thereafter, using the marked cut line 138, the barrel 112 is cut. After cutting is completed, the head 110 is assembled to the barrel 112 forming the pin 102. After the pin 102 is assembled, the pin 102 is installed in the mold 40 such that the pin 102 is captured by an ejector plate assembly. Preferably, the pin 102 is assembled such that its head 110 is captured by ejector plate assembly 100.

Another preferred ejector pin embodiment 102a (FIG. 21), including its head 140, barrel 148, and novel mounting arrangement, is shown in FIG. 21. The head 140 has a bore 142 with internal threads 144 for receiving and threadably engaging a threaded portion 146 of the barrel 148 that is located at the end of the barrel 148. Only a portion of the barrel 148 is shown in FIG. 21. The head 140 has an axially inwardly extending recess or counterbore 150 that is defined by an upraised sidewall 152 and faces toward the barrel 148 when the barrel 148 is assembled to the head 140. The radially inner surface of the sidewall 152 has a plurality of pairs of generally arcuate notches 154 forming an arcuately notched radial inner periphery.

A coupling ring 156 is used to help couple the barrel 148 to the head 140 such that there is no relative rotation between the barrel 148 and head 140. The ring 156 is received in the counterbore 150 in the head 140. The ring 156 has a pair of radially outwardly extending, circumferentially spaced apart, and preferably arcuate projections 158 that are each received in one of the notches 154 thereby preventing the ring 156 from rotating relative to the head 140. An arcuate locator projection 160 that extends radially inwardly from the ring 156 is received in a radially inwardly extending locator groove 162 that extends axially at least a portion of the length of the barrel 148. As is shown in FIG. 21, the groove 162 extends axially from the threaded end 164 of the barrel 148 toward the opposite end. So that the barrel 148 is of sufficient length so it can be cut to a wide variety of lengths, the groove 162 is elongate and preferably terminates axially beyond the threaded portion 146 at an unthreaded portion 166 of the barrel 148. If desired, the ring 156 can be a washer.

In use, after the barrel 148 is cut to length, the ring 156 is placed over the threaded end 146 of the barrel 148, and the barrel 148 is threaded into the head 140. When the barrel 149 is threaded sufficiently far into the head 140, the ring 156 is urged axially toward the head 140 until the ring 156 is received in the recess 150 such that its locators 158 are received into locator notches 154 in the head 140. When the ring 156 is received in the recess 150, it functions as a locking mechanism to prevent the barrel 148 from rotating relative to the head 140. So that both the head 140 and barrel 148 do not rotate relative to the ejector plate assembly 100, the head 140 can have a locator, such as the locator surface 136 shown in FIG. 15.

FIG. 22 depicts another preferred ejector pin embodiment 102b. The barrel 170 has a threaded portion 172 adjacent one end that is threaded into a threaded bore 174 in the head 176. The head 176 is generally U-shaped and comprises a pair of arms 178 and 180 clamped around the threaded portion 172 by a fastener 182 that joins the arms 178 and 189 together. Preferably, the fastener 182 extends through a bore in one of the arms 178 into a threaded bore in the other of the arms 180.

FIG. 23 illustrates a novel ejector pin blank 184 from which an ejector pin 103 (FIG. 3) of one-piece and unitary construction is constructed. The blank 184 comprises a hardened barrel portion 186 and an unhardened portion 188 that can be cut to the desired length and turned on a lathe to form the ejector pin head 190 (shown in phantom). The ejector pin blank 184 preferably is shipped substantially in the form shown in FIG. 23 to an end user, such as a mold operator or the like, who can complete manufacture of the ejector pin by cutting the unhardened portion 188 to size and thereafter turning it to form the head 190. If desired, the unhardened portion 188 can be cut to size substantially simultaneously while it is being turned.

For example, for the blank shown in FIG. 23, a portion of the end of the bar stock can be cut to phantom line 194 or turned to phantom line 194. The bar stock is also turned to phantom line 196 to form the head 190. When turning of the head 190 is finished, it results in an ejector pin 103 of one-piece and unitary construction, such as the ejector pin 103 shown in FIG. 3, having a length suitable for the mold in which it is to be installed.

In a method of making the blank 184, bar stock comprised of a metal or another machinable material is machined to form a necked down portion 186 having a diameter less than that of the bar stock and the unhardened portion 188. Preferably, the bar stock is machined by turning it on a lathe, or by using another material removal process, to provide the necked down portion 186. Thereafter, the necked down portion 186 preferably is hardened, such as by a nitriding or another surface hardening process, such that the exterior of portion 186 is hardened about its circumference from the end 192 of the blank 184 substantially to the unhardened portion 188. The diametrically necked down portion 186 is hardened to a depth of at least about one micron, and as much as one-hundred microns, about the periphery of the pin barrel to minimize wear of the pin 103 as it is repeatedly reciprocated in the mold 40 during operation.

The bar stock preferably is comprised of a machinable or formable material that is suitable for use as an ejector pin 103. One preferred bar stock material is H13 steel alloy because it can be easily machined or formed while possessing good wear resistance and toughness. Other metals and alloys can be used.

Insert

1. Indicia Imprinting Insert

FIGS. 1, 10, 12 and 14C shows three different exemplary and preferred indicia-imprinting inserts 50a, 50b, and 50c carried by the mold and each of which are disposed in a mold cavity. Where an indicia-imprinting insert is not referred to by letter a, b, or c, it is generally referred to as reference numeral 50. An indicia-imprinting insert 50 of this invention is constructed and arranged to leave an imprint of its outer surface 198 when the hardenable material 53 in the cavity has hardened.

Figures 11, 12:
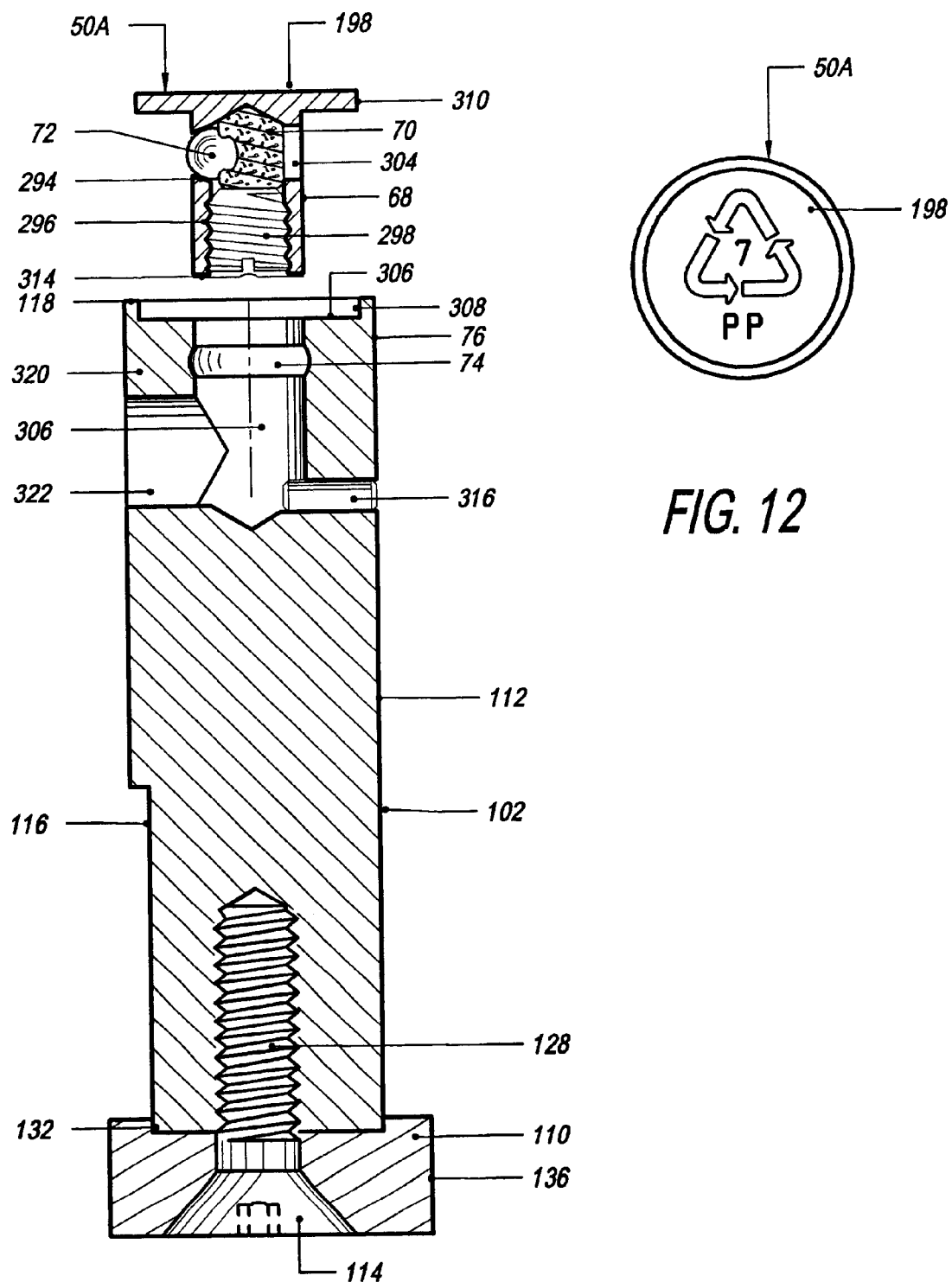
FIG. 11 illustrates an enlarged exploded cross sectional view of the second preferred embodiment of the insert.
FIG. 12 illustrates a top surface of the insert plug shown in FIG. 11.

Referring to FIGS. 1 and 12, one such insert 50a is mounted to a pin 102 in cavity 42 and is constructed such that it preferably does not rotate. The insert 50a preferably is used to imprint the type of hardenable material 53 being molded. For example, the insert 50a indicates material no. 7 for polypropylene.

Referring to FIGS. 1 and 10, another such insert 50c is mounted to a pin 102 in the cavity 42 and which has a removable circular centrally located, indicia-imprinting outer insert surface 200 carried by plug 68. The plug 68 is received within a pair of generally concentric indicia-imprinting rings 202 and 204. Both the center insert surface 200 and the inner ring 202 preferably can be rotated, both relative to each other and relative to the outer ring 204.

The insert 50c is used to imprint the date, month and year into the hardenable material 53 being molded. The center insert surface 200 imprints the year and an arrow 201 that indicates the month of molding, with the months imprinted by the inner ring 202. The inner ring 202 also has an arrow 203 that indicates the day of the month, with the days of the month imprinted by the outer ring 204. The arrows 201 and 203 preferably are recessed so as to accept a blade of a screwdriver to quickly and easily turn the insert surface 200 or ring 202.

Referring to FIGS. 1, 9A, and 14C, a still further such insert 50b is mounted to the pin 102 in another cavity 44 which has a central, circular indicia-imprinting insert surface 206, which is rotatable, and an outer indicia-imprinting ring 208 that preferably is stationary. The insert 50b is used to imprint the month and year into the hardenable material 53 being molded.

Each of the aforementioned inserts 50 imprint a specific indicia. Other inserts 50 are possible that fall within the scope of the invention, including inserts that imprint messages, pictures, trademark symbols, trademarks, trade names, model numbers, part numbers, the time of manufacture, time of expiration, and other messages, symbols, or functions.

Each insert 50 preferably is carried by an ejector pin 102 or 103. However, where the insert 50 has a portion that is rotatable, it need not be carried by an ejector pin 102 but can reside in the mold cavity, preferably within a pocket in the cavity.

2. Runner Flow Shut-Off Insert

FIGS. 1 and 5 depict a runner flow shut-off insert 52a. The insert 52a has a channel 210 in its outer surface 212 and is constructed and arranged to control flow of hardenable material 53 from an upstream portion of a feeder channel 88 to a downstream portion of the channel 88. The insert 52a can be rotated to a first position, shown in FIG. 1, that obstructs flow to one of the mold cavities 46 by obstructing flow through the feeder channel 88. The insert 52a can also be rotated to a second position where the channel 210 aligns with the feeder channel 88 for permitting flow through to the mold cavity 46. Preferably, the insert 52a is rotated about 90° to move between the first position, i.e. a closed position, and the second position, i.e. and open position.

3. Flow Diverter Insert

FIGS. 1, and 16–20 illustrate flow diverter inserts 52b and 52c for controlling flow of the hardenable material 53 to a single mold cavity 48, a pair of cavities 42 and 44, or more than two cavities. The insert 52b and 52c has a pair of channels 214 and 216 disposed at an angle relative to each other that is rotated between a plurality of positions to divert flow to one or more mold cavities or to completely obstruct flow to any cavity.

In one preferred insert 52b, the insert 52b has one channel 214 disposed at about a 90° angle relative to another channel 216. Referring to FIG. 1, the insert 52b has a first position, an open position, where one of the channels 216 is generally aligned with the supply channel 86 and the other of the channels 214 is aligned with the feeder channel 88 that extends to the cavity 48 for permitting flow of hardenable material 53 to the cavity 48. When the insert 52b rotated away from the open position, such as the closed position shown in FIG. 3, the channels 214 and 216 are no longer aligned with channels 86 and 88 and flow is obstructed to the cavity 48. If desired, the insert 52b can be indexed at specific angular increments, such as about 90° for example, such that the insert 52b can be moved about 90° between its open position, permitting flow, and a closed position, obstructing flow, that is disposed from the open position.

Figure 16:
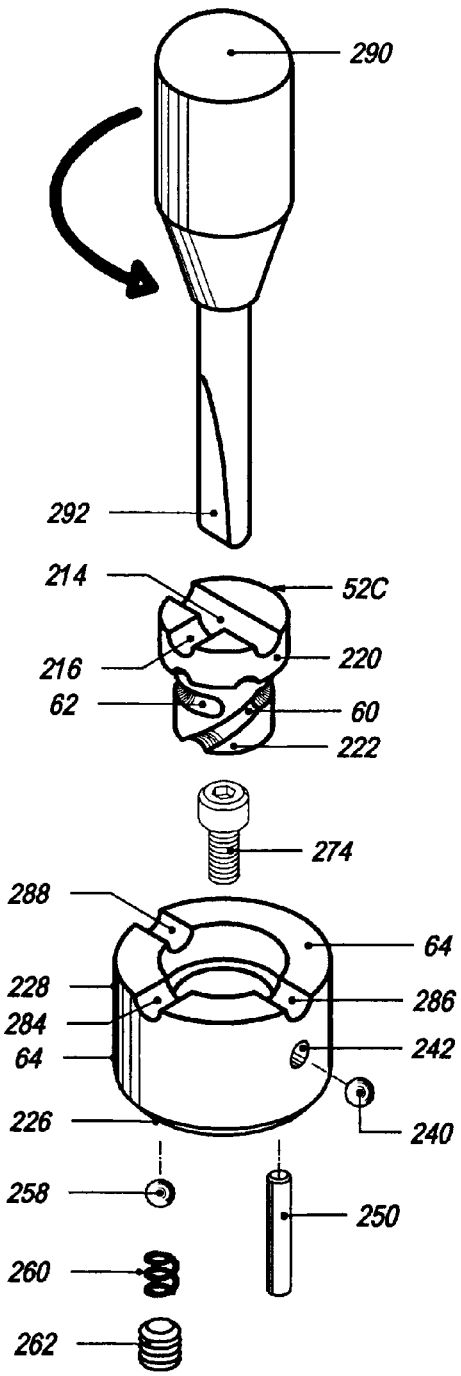
FIG. 16 is an exploded perspective of an insert for diverting flow.

In another preferred insert 52c, shown in FIGS. 1, 3, and 16, the insert has a pair of channels 214 and 216 arranged in a T-shape capable of controlling flow to a pair of cavities 42 and 44. The first channel 214 extends the length of the insert 52c and the second channel 216 is disposed at an angle relative to the first channel 214 and intercepts the channel 214. Preferably, the second channel 216 is disposed at about a 90° angle relative to the first channel 216.

Figure 20:
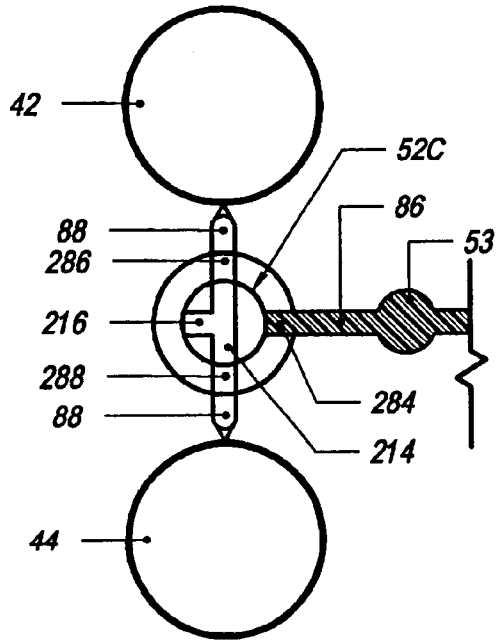

Referring to FIG. 16, the cup 64' also has channels 284, 286 and 288. Referring to FIG. 20, channel 284 is aligned with channel 86, channel 286 is aligned with channel 88, and channel 288 is aligned with channel 88.

Figure 17:
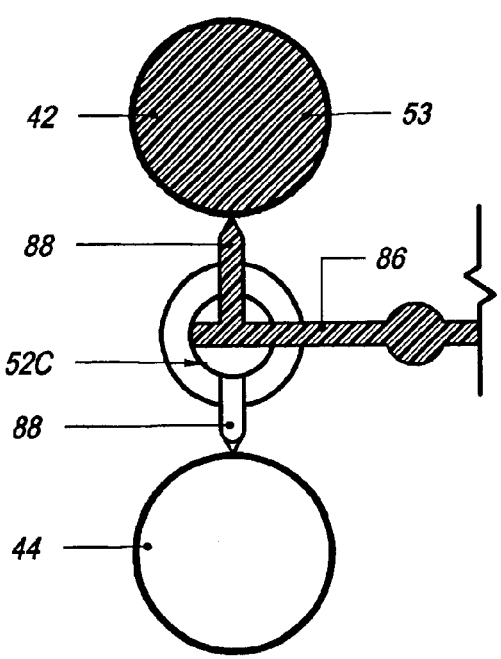
FIGS. 17–20 illustrates control of flow using the insert shown in FIG. 16.
Figure 18:
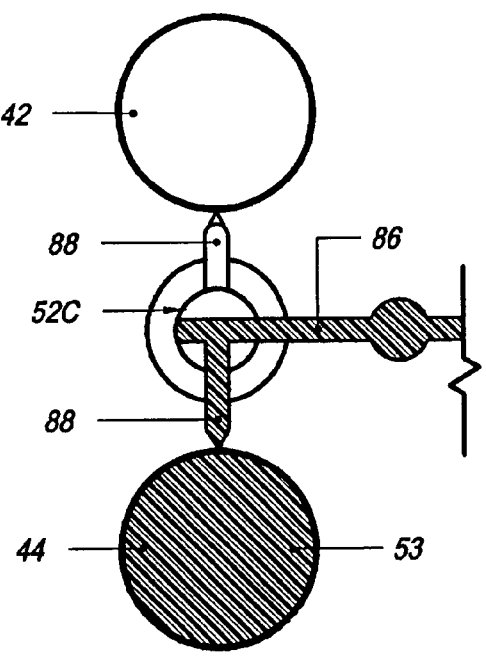
Figure 19:
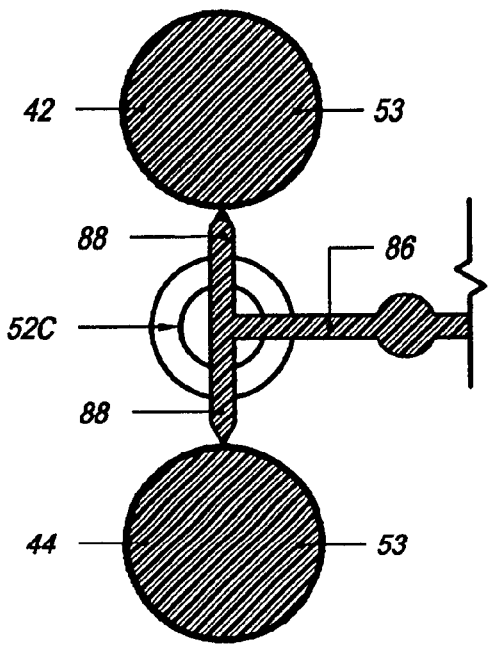

Referring to FIGS. 17–20, the insert 52c can be disposed in a plurality of positions for diverting flow of material 53 to either one or both cavities 42 and 44. FIG. 17 shows the insert 52c disposed in a first position diverting flow to one cavity 42. FIG. 18 shows the insert 52c disposed in a second position diverting flow to another cavity 44. FIG. 19 shows the insert 52c in a third position diverting flow to both cavities 42 and 44. FIG. 20 shows the insert 52c disposed in a fourth position obstructing flow to both cavities 42 and 44. Preferably, the insert 52c is indexable in angular increments of about 90°.

While two cavities 42 and 44 are shown, the insert 52 can be constructed to distribute flow to more than two cavities, if desired. Of course, such an insert 52 would have more than four positions.

Referring to FIG. 16, to rotate any of the inserts 52a, 52b, and 52c, a tool 290 engages the insert and is manually rotated while the mold 40 is open. Preferably, the tool 290 is a screwdriver. Preferably, the blade 292 of the screwdriver 290 is received in one of the channels, such as channel 214, in the insert and the screwdriver 290 and insert are rotated in unison.

Rotating Mechanism

Each insert 50 and 52 can be carried by a rotating mechanism 54 or 66 of this invention. The rotating mechanism 54 or 66 can be constructed simply to permit the insert 50 or 52 to rotate and be positioned at any angular position, between any limits of rotation the rotating mechanism 54 or 66 may possess. Preferably, the rotating mechanism 54 or 66 is constructed to permit the insert 50 or 52 to be selectively rotated or indexed between a finite number of positions.

1. First Preferred Embodiment

Figure 9B:
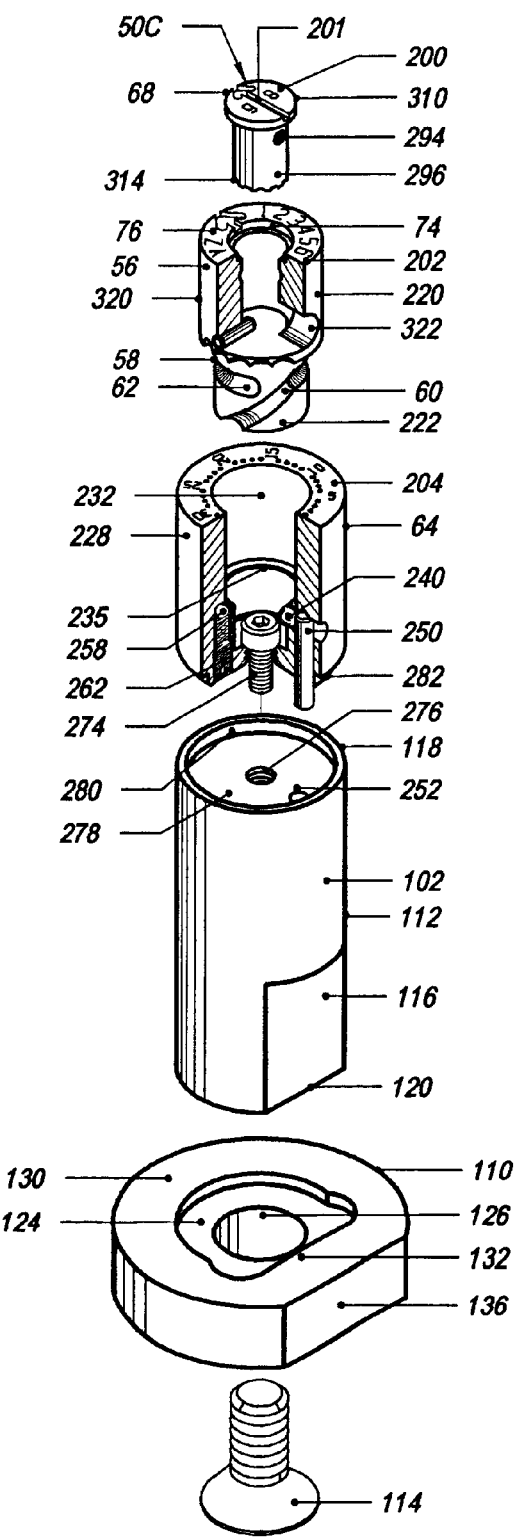
FIG. 9B illustrates a fourth preferred embodiment of the insert.
Figure 9C:
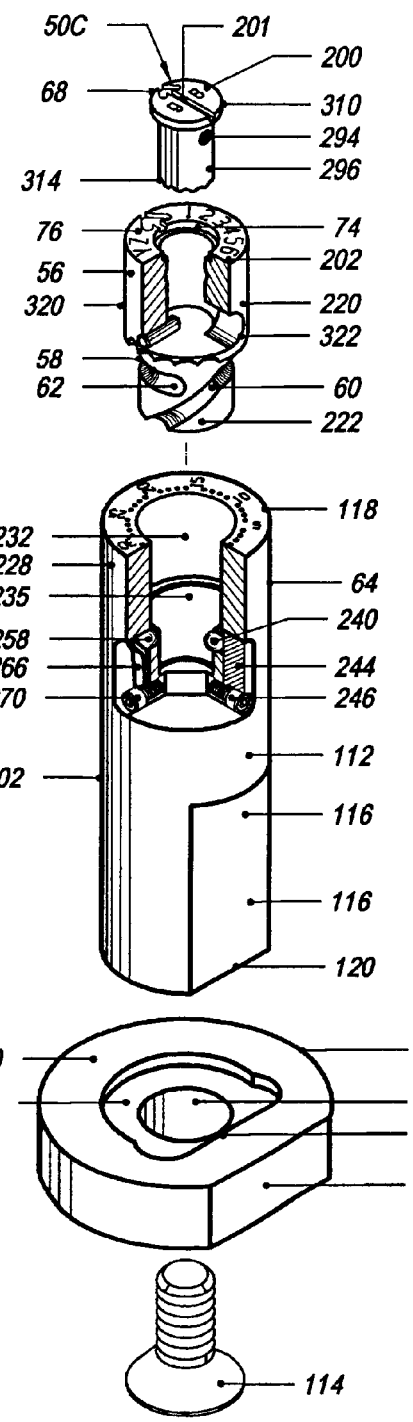
FIG. 9C illustrates a fifth preferred embodiment of the insert.

FIGS. 2–6 illustrate a first preferred rotating mechanism 54 for rotatably receiving an insert, such as the aforementioned indicia-imprinting inserts 50a, 50b, or 50c, the runner flow shut-off insert 52a, the flow diverter insert 52b or 52c, or another insert. The insert is attached to or integral with the plug 56 that is received in the sleeve-like cup 64. The cup 64 is either integral with the mold 40 or ejector pin 102 or is a separate cup 64', such as is shown in FIGS. 3 and 9B, that is mounted to one end of the pin 102 or received in a pocket 218 in the mold 40.

Referring to FIGS. 4 and 5, the plug 56 has a head 220 that is larger than the plug body or stem 222. The plug body or stem 222 has a groove or thread 58 that extends about the circumference of the body 222. As is shown in more detail in FIG. 6, the groove 58 is open 61 at one end to permit the plug 56 to easily accept the locator or guide 240 carried by the cup 64 or 64' so the plug 56 can be quickly and easily inserted into the cup 64 or 64'. Conversely, this construction also enables the plug 56 to be quickly and easily removed from the cup 64 or 64'.

An entranceway portion 60 of the groove 58 is disposed at an arcuate angle relative to a portion 62 of the groove 58 that is generally transverse to the lengthwise direction of the plug 56. Preferably, the entranceway portion 60 is generally helical. The opening 61 in the entranceway groove portion 60 permits the plug 56 to be positively received and retained by the cup 64 or 64'. The entranceway 60 extends in one direction to an axial end 224 of the body 222 where its opening 61 is constructed to accept the guide 240. The entranceway groove portion 60 extends in an opposite direction to the transverse groove portion 62. The groove portion 62 has an end wall 63 that functions as a stop to limit rotation of the plug 56.

Preferably, the groove 58 is at least about 0.040 inches wide, preferably at least about 0.07 inches wide, and at least about 0.020 inches deep so it will accept a ball 240 of at least about 0.076 inches diameter such that the plug 56 will be retained in the cup 64 or 64' during operation. The transverse portion 62 of the groove 56 preferably extends at least about 250° around the body 222 such that the plug can be rotated about the same amount without axially displacing relative to the cup. The transverse portion 62 preferably extends no more than about 330° around the body 222.

Figure 6:
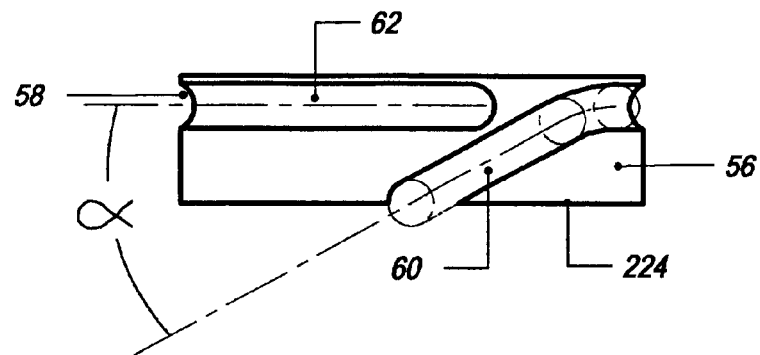
FIG. 6 is an enlarged view of a portion of the insert enclosed by the circle shown in FIG. 5 depicting a helical groove that facilitates rotation of the plug of the insert.

The groove entrance portion 60 is acutely angled relative to the transverse groove portion 62. Referring to FIG. 6, the groove entrance portion 60 is angled at an angle, α, of about 30° relative to the transverse groove portion 62 for maximizing the angular range of rotation of the plug. Preferably, the groove entrance portion 60 is angled at an angle, α, of no greater than about 45° and at least about 20°. Preferably, the groove entranceway 60 extends between about 40° and about 60° around the plug body 222. Preferably, the entranceway 60 and transverse portion 62 extend at least about two-thirds of a revolution about the body 222 and no more than about 300° about the body 222.

The groove 58 preferably comprises is a radially inwardly extending channel of arcuate, hemispherical, triangular, square or another profile. In its preferred embodiment, the groove 58 encircles the outer periphery of the plug 56 no more than once.

Referring to FIG. 8, the cup 64 or 64' has a bottom wall 226, a sidewall 228, and an opening 230 defining a cavity 232 into which the plug 56 is received. The cavity 232 has a shape substantially complementary to the plug 56 so that when the plug 56 is inserted into the cavity 232, its top surface is flush with the top surface of the cup 64 or 64'. The cavity 232 has a diametrically larger portion 234 for receiving the head 220 of the plug 56 and a shoulder 235 that defines a diametrically smaller portion 236 for receiving the body 222 of the plug 56. The cup 64 or 64' has a radially inwardly extending guide 240 that is received in the groove 58 of the plug 56 when the plug 56 is inserted into the cavity 232.

Referring to FIG. 5, the inwardly extending guide 240 preferably has a contour such that it can be positively received in the groove 58 and retain the plug 56 in the cup 64' or 64. Preferably, the plug 56 cannot be withdrawn from the cup 64 or 64' when the guide 240 is received in the transverse groove portion 62. In its preferred embodiment, the guide 240 is a ball, such as a ball bearing or the like. The sidewall 228 has a bore 242 that extends from the exterior of the sidewall 228 inwardly into the cavity 232 for receiving the guide ball 240. The width or diameter of the bore 242 preferably tapers at least slightly at its cavity end to prevent the ball 240 from passing completely through the bore 242 into the cavity 232.

As is shown in FIG. 8, the guide ball 240 is captured in the bore 242 by a cap 244 attached to the sidewall 228 by a bolt or screw 246 that is threaded into a threaded bore in the sidewall 228. If desired, the cap 244 can resiliently bias the ball 240 into the cavity 232. The cap 244 preferably is received in a recess 248 in the exterior of the cup sidewall 228.

Referring to FIG. 5, the ball 240 can be captured in the bore 242 by an axially extending pin 250. The pin 250 preferably extends outwardly from the cup 64' into a bore in the mold 40 (FIG. 3) or into a bore 252 in the ejector pin 102 (FIG. 4) for locating the insert and rotating mechanism while also preventing inadvertent rotation of the insert and rotating mechanism during operation.

Referring to FIG. 5, to enable the plug 56 to be selectively rotated to specific positions during operation, a bottom shoulder 254 of the plug head 220 has a plurality of detent receivers 256 that are preferably circumferentially spaced apart around the shoulder 254. Preferably, each detent receiver 256 comprises a notch, indention, or cutout in the shoulder 254. To prevent the plug 56 from moving away from the selected position, the cup 64 or 64' has a detent 258 that registers with one of the detent receivers 256. In a preferred detent embodiment, the detent 258 comprises a detent assembly that includes a ball 258 biased by a spring 260 into the cavity 232 adjacent shoulder 235 to permit rotation of the plug 56 in the cup 64 or 64'. Preferably, the detent assembly comprises a spring-plunger 262 threadably received in a threaded bore 264 that preferably extends axially in the cup sidewall 228 into the cavity 232. The assembly is shown in more detail in FIGS. 9B, 15, and 16.

Referring to FIGS. 7, 8, 9A, and 9C, another preferred detent assembly is shown. The detent assembly comprises a leaf spring or beam spring 266 received in a pocket 268 in the cup sidewall 228 that is secured by a screw or bolt 270 to an ejector pin 102 or the mold 40. The leaf 266 urges the detent ball 258 into the cavity 232 while flexing slightly to accommodate rotation of the plug 56 when the position of the plug 56 is being changed. As is shown in FIG. 9A, the detent assembly is particularly well suited for ejector pins 102 or 103.

Where the cup 64' is not integral with one of the mold cavities or the ejector pin 102, the bottom wall 226 of the cup 64' has a bore 272 through which a bolt 274 extends that is threaded into a threaded bore 276 (FIG. 15) in the body, such as ejector pin 102, to which the cup 64' is mounted. So that the cup 64' can be withdrawn from the pocket it is received, such as a pocket in the mold 40, the diameter of the bore 272 preferably is larger than the diameter of the mounting bolt 274 to accommodate a second bolt, preferably a threaded jack screw, that is threaded into bore 272. When threaded into bore 272, the jack screw presses against the mold urging it away from the mold so it can be withdrawn completely out of the mold. In this manner, the cup 64' can be tightly, frictionally fit into a pocket in the mold 40, such as is shown in FIG. 3, or tightly, frictionally fit into a pocket in another body.

Figure 15:
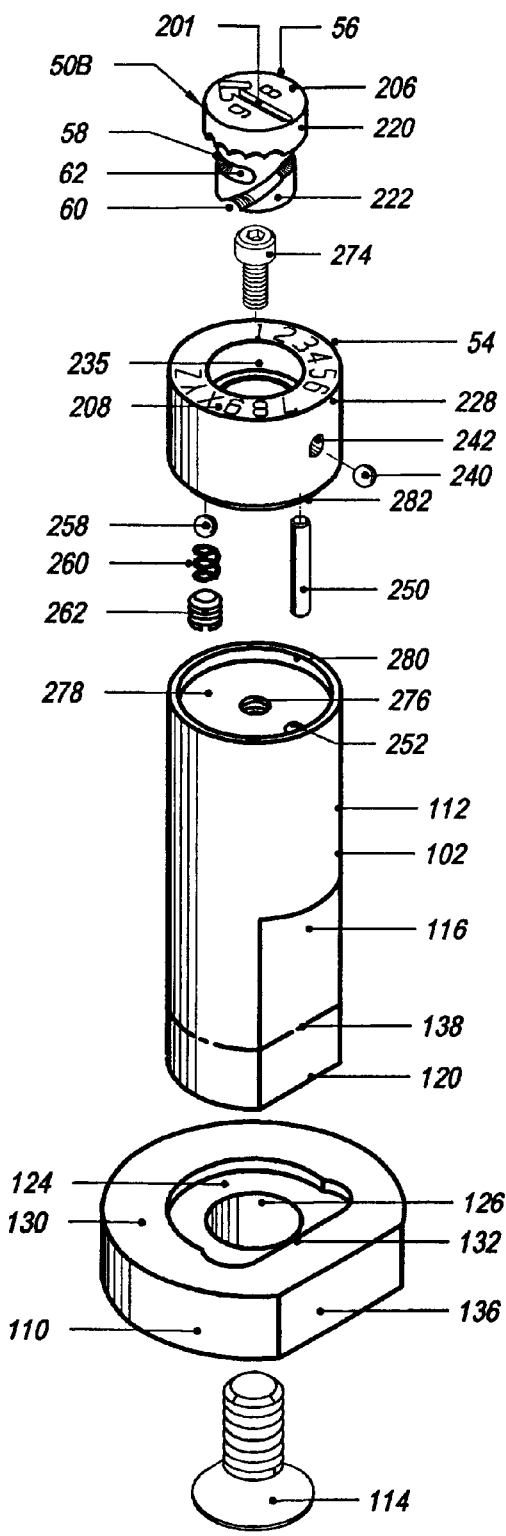
FIG. 15 illustrates an exploded perspective view of another preferred embodiment of the insert and ejector pin showing one preferred embodiment for mounting the pin to a head.

When mounted to an ejector pin 102, such as is shown in FIGS. 9B and 15, the mounting surface 278 of the pin 102 has an upstanding flange 280 about its periphery that is coaxially received in a complementary ridge 282 in the bottom of the cup 64'. The flange 280 and ridge 282 mate to locate the cup 64' and therefore the insert attached to the plug 56 received in the cup 64'.

Plug 56 is made of a material that is durable, resilient, tough, and preferably wear resistant for withstanding the demanding environment of a mold. Cup 64 or 64' is also made of a material that is durable, resilient, tough, and preferably wear resistant. The plug 56 preferably is made of a metal, such as H13 steel, A2 steel, 420 stainless steel, 440 stainless steel, 450 stainless steel, or 455 stainless steel. Preferably, the plug 56 is made of a heat treatable stainless steel such as 420, 440, or 455 stainless steel. If desired, the plug 56 can be made of a thermoset material, a ceramic material, a brass material, aluminum, copper, or an alloy. The cup 64 or 64 preferably is made of a metal, such as H13, A2, 420 stainless steel, 440 stainless steel, 450 stainless steel, or 455 stainless steel. Preferably, the cup 64 or 64' and is made of 455 stainless steel. If desired, the cup 64 or 64' can be made of a thermoset material, a ceramic material, brass, aluminum, copper, or a metal or composite alloy.

2. Second Preferred Embodiment

FIGS. 2, 7, 9A–9C, 11, 13, and 14A–14B illustrate a second preferred rotating mechanism 66 that preferably carries an insert, such as, for example, insert 50 or 52. The insert 50 or 52 is attached to or integral with an axially extending plug 68 that receives a flexible and resilient biasing element 70 that helps capture locator 72 in a hollow (FIG. 7) within the plug 68.

The plug 68 is of hollow or tubular construction and can be a tube or sleeve that preferably is generally cylindrical. The plug 68 is telescopically received in a cup 76. The cup 76 can be integral with the mold 40 or an ejector pin 102 or 103 or is a separable component that is mounted to one end of the pin 102 or 103 or received in a pocket in the mold 40.

The biasing element 70 preferably comprises a wad of non-metallic material that preferably is flexible and resilient. The wad 70 preferably is comprised of rubber, a rubber-like material, an elastomer, a polymer, a plastic, a nylon, a thermoplastic material, a thermoset material, or another material suitable for use in biasing locator 72 outwardly from a bore 294 in a sidewall 296 of the plug 68.

The locator 72 preferably has a rounded surface that extends generally radially outwardly from the bore 294 (FIG. 13) and that is received in a groove 74 in the interior surface of the cup 76 when the plug 68 is inserted into the cup 76. While the locator 72 can comprise a pin or the like, the locator 72 preferably comprises a ball, such as a ball bearing or similar.

As is shown more clearly in FIG. 13, the biasing element 70 is retained in the plug 68 by a retainer 298 that preferably is a screw, preferably a set screw, or a bolt that is threaded into a threaded portion of the hollow 302 (FIGS. 14A and 14B) in the plug 68. In its preferred embodiment, the retainer 298 is a spring plunger that has a tip 300 that bears against the biasing element 70. The retainer 298 is also constructed and arranged to capture both the biasing element 70 and locator 72 in the hollow 302 within the plug 68. Together, the retainer 298 and biasing element 70 urge the locator 72 outwardly from port 294 but permit the locator 72 to be retracted, at least slightly, into the port 294 to permit the plug 68 to be quickly and easily to be inserted into and removed from the cup 76.

To remove the locator 72, biasing element 70 from the plug 68, the sidewall 296 of the plug 68 has an access port 304 (FIG. 11) to permit a tool, such as a screw driver 290, to be inserted into the port 304. With the retainer 298 removed, the tool 290 is inserted through the port 304 to pry free the biasing element 70 such that the biasing element 70 and locator 72 are urged out the hollow 302.

The cup 76 has a cavity 306 into which the plug 68 is telescopically inserted. Referring to FIG. 11, the axial end 118 of the cup 76 preferably has a recess 308 that is complementary to the head 310, or insert 50 or 52, carried by the plug 68 so that when the plug 68 is inserted into the cup 76, the outer axial surface of the head 310 or insert 50 or 52 carried by the is flush or substantially flush with the outer axial surface of the cup 76. To retain the plug 68 in the cup 76, the cavity 306 has a generally radially outwardly extending internal groove 74 that receives the locator 72.

As is shown more clearly in FIGS. 14A and 14B, the inner axial end 312 of the plug 68 has a plurality of spaced apart detent receivers 314, each of which preferably is a notch or the like, that receives a detent 316 that preferably is a pin 316 that is received in a bore 318 that extends radially inwardly through cup sidewall 320 into the cup cavity 306. As seen in FIG. 13, the detent notches 314 cooperate with the detent pin 316 (FIG. 7) to permit the plug 68, and thereby the insert 50 or 52 carried by the plug 68, to be selectively indexed relative to the cup 76. Preferably, a tool, such as screwdriver 290, is used to index the plug 68 into slot 201. So that the plug 68 can be quickly and easily removed from the cup 76, the cup sidewall 320 has an access port 322 through which a tool, such as screwdriver 290, can be inserted to pry the plug 68 upwardly until it is freed. Thereafter, the plug 68 can be manually removed and another plug 68 with a different insert or the like inserted into the cup 76.

Plug 69 is made of a material that is durable, resilient, tough, and preferably wear resistant for withstanding the demanding environment of a mold. Cup 76 is also made of a material that is durable, resilient, tough, and preferably wear resistant. The plug 68 preferably is made of a metal, such as 455 stainless steel, 440 stainless steel, 420 stainless steel, H13, A2, or another alloy. Preferably, the plug 68 is made of 455 stainless steel. If desired, the plug 68 can be made of a thermoset material, a ceramic material, brass, aluminum, copper, or a composite or synthetic material. The cup 76 preferably is made of a metal, such as H13, A2, 420 stainless steel, 440 stainless steel, 455 stainless steel, or another alloy. Preferably, the cup 68 and is made of a material that can be heat treated, nitrided, or surface hardened. If desired, the cup 76 can be made of a thermoset material, a ceramic material, brass, aluminum, copper, or a composite or synthetic material.

Use and Operation

In use, the inserts of the invention, preferably inserts 50 and 52, are used for imprinting an indicia in material 53 in a cavity that is hardenable, or for diverting or controlling the flow of the hardenable material 53 upstream of a mold cavity. The inserts of the invention are well suited for use in molding applications, such as where plastic, metal, a polymer, or another material is the hardenable material 53 being molded. The inserts of the invention are also well suited for use in other molding applications, including applications where a metal such as steel, aluminum, titanium, copper, iron, or another metal is the hardenable material 53 being molded.

In use, the rotating mechanisms 54 and 66 of the invention are used for enabling the inserts, such as insert 50 or 52, to be quickly and easily rotated such that mold down time is reduced as compared to other such mechanisms and preferably minimized. Additionally, the rotating mechanisms 54 and 66 is well suited for use with inserts of a type other than indicia imprinting inserts 50 and flow-controlling or flow diverting inserts 52.

In use, the ejector pin embodiments 102, 102a, 102b and 102c of the invention are advantageously versatile in that they enable ejector pins pre-equipped with inserts, such as insert 50, to be shipped and cut to size at another site, such as the site of the mold. By their advantageous construction, manufacturing time is reduced thereby increasing production. Moreover, by their construction, ejector pins can be cut accurately to size for the mold into which they will be used thereby taking into account any deviations in tolerance or the like that may be present in the mold thereby preventing excessive wear and minimizing or preventing clashing that might occur.

In operation, the indicia imprinting insert 50 is used to imprint an impression of two-dimensional or three-dimensional contour into the hardenable material 53 so the impression remains in the hardenable material 53 even after it has completely hardened. When mounted to an ejector pin 102 or 103, the pin is extended outwardly from the mold 40 such that the insert 50 makes contact with the hardenable material 53 and leaves an impression in it such that the impression remains when the material 53 is hardened. As the pin 102 or 103 is further extended, it urges the material 53, now in molded form, away from the mold cavity so it can be removed completely from the mold 40.

To rotate or index the insert 50, the mold 40 is opened exposing the insert 50. A tool, preferably a screwdriver 290, is used to engage the insert 50 and turn the insert 50 or one or more the rings of the insert 50 to the desired position. Once the desired position has been set, the mold 40 is closed and molding can begin. As a result of the detent construction previously described, the position of the insert 50 or any ring of the insert 50 will not wander during repeated cycling of the mold 40.

The flow controlling or diverting insert 52 is used to divert or control flow of the hardenable material 53 and is typically disposed in a channel, such as runner or channel 86 and 88, between the source of the hardenable material 90 and one or more mold cavities 42, 44, 46, 48. To change the position of the insert 52, the mold 40 is opened and a tool 290 is used to engage and rotate the insert 52. When the insert 52 has been rotated to the desired position, the mold 40 is closed and the mold 40 can be operated. By its advantageous construction, each insert, such as 52a, 52b, and 52c, is used to provide flow of hardenable material 53 only to the mold cavity where flow of hardenable material 53 is needed. Thus, for production runs where only some cavities are to be used to mold components and others are not to be used, one or more the inserts 52 are used to control flow.

In use, the first preferred rotating mechanism 54 is used to facilitate rotation of an insert, such as insert 50 or 52. The rotating mechanism 54 preferably enables the insert to be selectively indexed to preset or predetermined positions. When rotated in one direction, the insert can be rotated until the guide 240 reaches an end, preferably an endwall, of the axial portion of the groove 58 in its outer sidewall. This end of the groove functions as a limit on the range of rotational adjustment of the rotating mechanism 54.

When rotated in an opposite direction, the guide 240 rides in the axial portion 62 of the groove 58 until it reaches the other end of the axial portion 62. The other end of the axial portion 62 of the groove 58 communicates with a helical or spiral portion 60 such that the guide 240 rides in the axial groove portion 62 until it reaches the helical groove portion 60. Further rotation causes the guide 240 to ride in the helical portion 60 causing the plug 56 of the rotating mechanism 54 and insert to displace axially upwardly relative to the cup 64 in which it is received. Further rotation causes the guide 240 to ride further along the helical portion 60 until it reaches the end of the helical portion 60 and the guide 240 passes beyond the end of the helical 60 thereby completely disengaging the plug 56 from the cup 64 so it can be lifted free of the cup 64 and removed.

Thereafter, if desired, another insert carried by another rotating mechanism 54 can be inserted into the cup 64. If desired, the insert can simply be changed and the same rotating mechanism 54 inserted into the cup 64.

To insert the rotating mechanism 54 into the cup 64, the plug 56 is placed in the cup cavity 232 until its axial end rests on guide 240. The plug 56 is rotated until the guide 240 is received in the open end or entryway of the helical portion 60 of groove 62. Further rotation causes the plug 56 to be drawn downwardly into the cup 64 by cooperation between the guide 240 and groove 58 as it rides in the helical portion 60. Preferably, the plug 56 is rotated until the guide 240 is received in the axial groove portion 62.

In the preferred embodiment shown, the plug 56 is rotated in a counterclockwise direction to remove the plug 56 from the cup 64 and the plug 56 is rotated in a clockwise direction to assemble the plug 56 into the cup 64.

The second rotating mechanism 66 is rotated such that its guide, locator 72, rides in groove 74 until the insert is located in the desired position. Detent 316 and detent notches 314 cooperate to permit the plug 68 of the mechanism 66 to be selectively indexed.

To remove the rotating mechanism 66 and insert, a tool 290 is inserted through port 322 and engages the axial end of the plug 68. Pressure is applied using the tool 290 against the axial end of the plug 68 to urge the plug 68 and insert upwardly relative to the cup 76. As the plug 68 is urged upwardly, the locator 72 is urged generally radially inwardly into the plug 68 against biasing element 70 such that the locator 72 clears groove 74 thereby disengaging it from the cup 76. After the biasing element 70 has disengaged from the cup 76, additional pressure causes the plug 68 to move farther axially upwardly relative to the cup 76 until the plug 68 can be manually lifted free of the cup 76.

To insert the rotating mechanism 66 into the cup 76, the plug 68 is placed into the cup cavity 306 such that its sidewall 296 is slidably, telescopically received in the cup 76. Pressure is applied to the outer surface 198 of the insert to urge the plug 68 farther into the cavity 306. By applying pressure, the locator 72 is urged inwardly against biasing element 70 into the plug 68 by the interior sidewall of the cup 76. When received in the groove 74 in the interior sidewall of the cup 76, the locator 72 is urged outwardly by the biasing element 70 thereby engaging the locator 72 with the cup 76. When the locator 72 is engaged with the cup 76 by being received in its groove 74, the plug 68 can be rotated but cannot be axially displaced.

It is also to be understood that, although the foregoing description and drawings describe and illustrate in detail preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. An insert that is disposed in a mold that includes a pair of mold halves that define a mold cavity when the mold halves are disposed together in a closed position, the insert comprising:

(a) a plug having an outer axial face that is exposed toward one the mold halves when the mold halves are disposed in the closed position, the plug having a body and an axis about which it can rotate, the outer axial face contoured to affect a hardenable molding material comprising one of a metal, a plastic or a polymer;

(b) a plug receiver disposed in another one of the mold halves and having a cavity therein having an opening at one end of the plug receiver through which the plug is inserted;

(c) (1) a groove in one of the plug and the plug receiver that encircles the periphery of the plug and which is comprised of (i) a single circumferential band portion that does not extend completely around the periphery of the plug and that is generally perpendicular to the axis of plug rotation, and (ii) a helical entranceway portion disposed at an angle relative to the circumferential band portion and which connects with the circumferential band portion, and (2) a locator that extends from the other one of the plug and the receiver and that (i) is received in the entranceway portion of the groove during assembly of the plug to the plug receiver, (ii) is received in the circumferential band portion of the groove when the plug is received in the plug receiver, and (iii) prevents removal of the plug from the plug receiver when the plug is received in the plug receiver and the locator is disposed in the circumferential band of the groove, and (d) a rotation resisting element carried by one of the plug and the plug receiver that contacts the other one of the plug and the plug receiver that resists rotation of the plug when the plug is disposed in the cavity in the plug receiver.

2. The insert of claim 1 wherein the plug receiver has a sidewall that defines the cavity and an interior sidewall surface wherein the locator extends radially inwardly from the interior sidewall surface into the cavity and the groove is formed in the plug.

3. The insert of claim 2 wherein (a) the plug comprises a body and a head that is larger than the body defining, a downturned shoulder therebetween, (b) the cavity is defined by a first sidewall and a second sidewall defining an upturned shoulder therebetween, (c) wherein the rotational resisting element comprises a plurality of spaced apart detent receivers disposed in one of the upturned shoulder and the downturned shoulder and a detent carried by the other one of the upturned shoulder and the downturned shoulder that opposes rotation of the plug relative to the plug receiver when the plug is received in the plug receiver and the detent is received in one of the detent receivers.

4. The insert of claim 1 wherein the groove has an arcuate cross sectional contour and the locator has a rounded end that is received in the groove when the plus is disposed in the plug receiver.

5. The insert of claim 4 wherein the groove is at least about 0.04 inches wide and at least about 0.02 inches deep, and the rounded end of the locator has a diameter of at least about 0.076 inches.

6. The insert of claim 1 wherein the groove has only a single entranceway portion of the groove.

7. The insert of claim 1 wherein the groove extends no more than about one and one-half times around the periphery of the plug.

8. The insert of claim 1 wherein the circumferential band portion of the groove extends at least about 250° around the periphery of the plug.

9. The insert of claim 6 wherein the groove has a depth of at least about 0.020 inches.

10. The insert of claim 9 wherein the groove has a width of at least about 0.040 inches.

11. The insert of claim 6 wherein the groove has a curvilinear cross-sectional contour.

12. The insert of claim 1 wherein the plug receiver has a bore and the locator comprises a ball received in the bore and which has a portion that extends outwardly into the cavity and wherein the portion of the ball that extends outwardly into the cavity is received in the groove to permit the plug to rotate relative to the plug receiver while limiting axial motion of the plug relative to the receiver.

13. The insert of claim 12 wherein the ball is retained in the bore by a plate removably attached to the plug receiver.

14. The insert of claim 12 wherein the receiver comprises a cup that is removably attached to the mold by a fastener.

15. The insert of claim 12 wherein the receiver comprises a cup and the cup is removably attached to an ejector pin that operably cooperates with the mold.

16. The insert of claim 15 wherein the cup is removably attached to the ejector pin by a fastener.

17. The insert of claim 12 wherein the receiver comprises a cup and the plug and cup are received in a pocket in a cavity in the mold and the axially outer face of the plug comprises an indicia embossing surface for affecting the hardenable molding material by leaving an impression in the hardenable material received in the mold cavity when the hardenable material hardens.

18. The insert of claim 12 wherein 1) the mold has a cavity therein for receiving the hardenable material therein from a source of the hardenable material, 2) the receiver comprises a cup that is received in a pocket in the mold, 3) the axially outer face of the plug has a channel therein, 4) wherein the plug i) is rotated to an open position to affect the hardenable material by permitting flow of the hardenable material from the source through the channel to the cavity in the mold, and ii) is rotated a closed position disposed from the open position to to affect the hardenable material by impeding flow of the hardenable material from the source through the channel and to the cavity in the mold.

19. The insert of claim 1 wherein the insert is carried by an ejector pin comprised of 1) bar stock that forms a barrel that is hardened and that is cut to length and 2) a head that has a larger diameter than the barrel that is attached to the barrel after the barrel has been hardened and cut to length.

20. An insert assembly for a mold comprising:

a first plug having 1) a first outer axial face that is contoured to affect a hardenable material by causing an indicia to be embossed directly into the hardenable material, and 2) a cavity in the outer axial face;

a receiver having a cavity therein for receiving the first plug;

a second plug received in the cavity in the first plug and having a second outer axial face that is contoured to affect a hardenable material by causing indicia to be embossed directly into the hardenable material;

wherein the hardenable material comprises one of a plastic and a polymer;

wherein a) one of the plugs has a generally cylindrical body that comprises 1) an outer sidewall with a radially extending bore that connects with an axially extending hollow therein, 2) a biasing element that is comprised of a non-metallic material and which is disposed in the axially extending hollow, and 3) a locator disposed in the bore that is urged outwardly by the biasing element such that a portion of the locator extends outwardly from the outer sidewall, and b) the cavity of the receiver in which the one of the plugs is received is defined by an interior sidewall that has a channel therein that receives the locator when the one of the plugs is disposed in the cavity; and wherein a) the other one of the plugs has a generally cylindrical body that comprises an outer sidewall with a channel in its exterior with the channel 1) having a first portion i) that is transverse to an axis of rotation of the other one of the plugs and ii) which extends no more than 360° around the outer sidewall, and 2) having a second portion that is inclined at an acute angle relative to the first portion of the channel, b) the receiver in which the other one of the plugs is received has a guide in its cavity that extends outwardly into the cavity and which is received in the channel when the other one of the plugs is disposed in the cavity, and c) wherein the other one of the plugs is rotatable without axial displacement when the other one of the plugs is disposed in the cavity and the guide is disposed in the first portion of the channel.

21. An insert for a mold having a pair of mold halves and an ejector pin comprising:

a rotatable plug having a head at one end with an axially outer face, a generally cylindrical body that has a free end at an opposite end, that is diametrically smaller than the head, and that has a groove therein that 1) is of arcuate cross section, 2) has a transverse portion that is perpendicular to a longitudinal axis of rotation of the plug and that extends no more than 360 degrees around the cylindrical body and 3) has an entranceway portion i) that is inclined relative to the transverse portion, ii) that leads to the transverse portion, and iii) that extends adjacent the free end of the plug body, and a shoulder formed where the head and body adjoin;

a fixed receiver having a cavity therein for receiving the plug with the cavity defined by a sidewall that has a radial shoulder disposed inside the cavity that divides the cavity into a first portion for receiving the head of the plug and a second portion that is diametrically smaller than the first portion for receiving the body of the plug;

a ball carried by the sidewall and disposed in a generally radially extending bore in the sidewall, wherein a portion of the ball is received in the groove when the plug is received in the cavity to permit the plug to rotate relative to the receiver while opposing axial motion of the plug relative to the receiver when the portion of the ball that is received in the groove is received in the transverse portion of the groove;

a detent assembly that permits the plug to be selectively indexed, the detent assembly comprising an axially extending spring plunger that is at least partially disposed in the radial shoulder of the receiver and that includes a ball that has at least a portion that extends from the radial shoulder of the receiver outwardly into the cavity and bears against the shoulder of the plug when the plug is received in the cavity of the receiver to oppose rotation of the plug relative to the receiver; and a fastener that removably attaches the receiver to one of the mold halves or the ejector pin.

22. The insert of claim 4 wherein the detent comprises an outwardly biased detent ball that is carried by the plug receiver and each detent receiver comprises a notch in the downturned shoulder of the plug wherein the detent ball opposes rotation of the plug relative to the plug receiver when the plug is received in the plug receiver and the detent ball is received in one of the notches.

23. The insert of claim 22 wherein the detent ball is biased outwardly by a spring plunger that has a longitudinal axis disposed generally parallel to the axis of rotation of the plug.

24. The insert assembly of claim 20 further comprising a retainer that engages the body of the one of the plugs to prevent removal of the biasing element from the hollow in the body of the one of the plugs and wherein the biasing element comprises a generally cylindrical wad of an elastomeric material.

25. The insert assembly of claim 20 further comprising a detent in the cavity in which the one of the plugs is received, wherein the outer sidewall of the one of the plugs has an axial end with a plurality of detent receivers and the detent is received in one of the detent receivers when the one of the plugs is received in the cavity to oppose rotation of the one of the plugs.

26. The insert assembly of claim 20 further comprising a third outer axial face that is contoured to affect a hardenable material by causing an indicia to be embossed into the hardenable material wherein the third outer axial face surrounds the first outer axial face and the second outer axial face.

27. The insert assembly of claim 20 wherein both of the plugs are carried by an ejector pin and are disposed at one end of the ejector pin.

28. An insert assembly for a mold comprising:

a first plug having 1) a first outer axial face that is contoured to affect a hardenable material by embossing an indicia into the hardenable material, and 2) a cavity in the outer axial face;

a receiver having a cavity therein for receiving the first plug;

a first rotating mechanism that operably cooperates with the first plug and the receiver to permit the first plug to be rotated relative to the mold;

a second plug received in the cavity in the first plug and having a second outer axial face that is contoured so as to affect a hardenable material by embossing an indicia into the hardenable material;

a second rotating mechanism that operably cooperates with the second plug and the first plug to permit the second plug to be rotated relative to the first plug;

wherein the hardenable material comprises one of a plastic and a polymer; and wherein a) one of the plugs has a generally cylindrical body that comprises an outer sidewall with a channel in its exterior with the channel 1) having a first portion i) that is transverse to an axis of rotation of the one of the plugs and ii) which extends no more than 360° around the outer sidewall, and 2) having a second portion that is inclined at an acute angle relative to the first portion of the channel, b) the receiver in which the one of the plugs is received has a guide in its cavity that extends outwardly into the cavity and which is received in the channel when the one of the plugs is disposed in the cavity, and c) wherein the one of the plugs can be rotated without axial displacement when the one of the plugs is disposed in the cavity and the guide is disposed in the first portion of the channel.

29. The insert assembly of claim 28 wherein the ball and groove comprise one of the first and second rotating mechanisms.

30. An insert that is disposed in a mold that includes a pair of mold halves, at least one of which defines a mold cavity, the insert comprising:
   (a) a plug having an axial face that is exposed toward one of the mold halves when the mold halves are disposed in a closed position, the plug having a generally cylindrical body and an axis about which the plug can rotate, the axial face three dimensionally contoured so as to affect hardenable molding material comprising a plastic or a polymer, the body having an outer wall that includes a groove that extends no more than one and one half times around the periphery of the body, the groove comprising a transverse portion that extends no more than a single time around the body and which is generally perpendicular to the axis about which the plug can rotate, and the groove comprising an entranceway portion that is disposed at an acute angle relative to the transverse portion that leads to the transverse portion;
   (b) a pocket in which at least the body of the plug is received, the pocket defined by a sidewall that includes a locator that is received in the groove when the body of the plug is received in the pocket;
   (c) wherein the axial face of the plug remains substantially planar during rotation of the plug when the locator is disposed in the transverse portion of the groove; and
   (d) further comprising a cup that has a recess that defines the pocket and wherein the cup is removably received in a receptacle in one of the mold halves.

31. The insert of claim 30 wherein the plug further comprises a head that is larger than the body defining a shoulder therebetween wherein the shoulder of the head includes a plurality of detent notches and the sidewall of the pocket further comprises a detent that registers with one of the detent notches of the head of the plug to resist rotation of the plug.

32. The insert of claim 31 wherein the sidewall that defines the pocket comprises a shoulder against which the shoulder of the head of the plug abuts when at least the body of the plug is received in the pocket and detent comprises a spring plunger that includes a ball that has at least a portion that extends outwardly from the shoulder of the sidewall that defines the pocket into the pocket.

33. The insert of claim 30 wherein the plug is disposed in the mold cavity and the axial face is three dimensionally contoured with indicia that is embossed or imprinted into the hardenable material.

34. The insert of claim 33 further comprising an ejector pin that has a barrel that is cut to axial length and attached by a fastener to a head of the ejector pin that is larger in width than the barrel.

35. The insert of claim 30 wherein the axial face of the plug further comprises a hardenable material flow channel.

36. The insert of claim 30 wherein the groove is at least 0.040 inches wide, at least 0.20 inches deep, the transverse portion of the groove extends between as much as 330° around the body of the plug, and the entranceway portion extends between 40° and 60° around the body of the plug and is disposed at an angle of between 20° and 40° relative to the transverse portion of the groove.

37. The insert of claim 36 wherein the transverse portion of the groove and the entranceway of the groove together extend no more than about 300° around the body.

38. An insert that is disposed in a mold that includes a pair of mold halves, at least one of which defines a mold cavity, the insert comprising:
   (a) a plug having an axial face that is exposed toward one of the mold halves when the mold halves are disposed in a closed position, the plug having a generally cylindrical body and an axis about which the plug can rotate, the axial face being three dimensionally contoured so as to affect a hardenable molding material comprising a plastic or a polymer, the body having a sidewall that defines a hollow therein and which has a bore therethrough, a locator disposed in the bore, and a non-metallic biasing element disposed in the hollow that urges the locator outwardly from the sidewall;
   (b) a pocket in which at least the body of the plug is received, the pocket defined by a sidewall that includes a groove that has a portion transverse to the axis of rotation of the plug that does not extend completely around the periphery of the sidewall, the groove receiving the locator when the body of the plug is received in the pocket, the groove including a helical entranceway portion that permits the locator to register with the groove during assembly of the body of the plug into the pocket; and
   (c) wherein the axial face of the plug remains substantially planar during rotation of the plug when the locator is disposed in the transverse portion of the groove.

39. The insert of claim 38 wherein the pocket is disposed in one of the mold cavities.

40. The insert of claim 39 wherein the pocket defined by a plug receiver that is removably received in a bore in one of the mold cavities.

41. The insert of claim 38 further comprising a retainer that engages the body of the plug to prevent removal of the biasing element from the hollow in the plug and wherein the biasing element comprises a generally cylindrical wad of an elastomeric material.

42. The insert of claim 38 further comprising a detent in the pocket in which the plug is received, wherein the outer sidewall of the plug has an axial end with a plurality of detent receivers and the detent is received in one of the detent receivers when the plug is received in the pocket to oppose rotation of the plug.

43. An insert disposed in a mold that includes a mold cavity, the insert comprising:
   (a) a plug having an axial face that is exposed to a hardenable molding material that flows into the mold cavity, the plug having a body and an axis about which it can rotate, the axial face contoured so as to affect the hardenable molding material;
   (b) a plug receiver disposed in the mold, the plug receiver having a plug-receiving cavity therein;
   (c) (1) a groove in one of the plug and the plug receiver that encircles the plug and which includes (i) a single circumferential band portion that does not extend completely around the plug and that is transverse to the axis of plug rotation, and (ii) an entranceway portion disposed at an angle relative to the circumferential band portion of the groove and which connects with the circumferential band portion of the groove, (2) a locator that extends from the other one of the plug and the receiver and that (i) is received in the entranceway portion of the groove when the plug is being inserted the plug receiver, (ii) is received in the circumferential band portion of the groove when the plug has been inserted into the plug receiver, and (iii) opposes removal of the plug from the plug receiver when the plug is received in the plug receiver and the locator is disposed in the circumferential band of the groove, and (3) wherein the groove has an arcuate cross sectional contour and the locator has a rounded end that is received in the groove when the plug is disposed in the receiver.

44. The insert of claim 43 wherein the groove is at least 0.04 inches wide and at least 0.02 inches deep, and wherein the rounded end of the locator is round and has a diameter at least 0.076 inches.

45. The insert of claim 43 wherein the groove has only a single entranceway portion of the groove and the entranceway portion of the groove is helical.

46. The insert of claim 43 wherein the groove extends no more than about one and one-half times around the periphery of the plug.

47. The insert of claim 46 wherein the circumferential band portion of the groove extends at least about 250° around the periphery of the plug.

48. The insert of claim 43 wherein the plug receiver has a bore and the locator comprises a ball received in the bore and which has a portion that extends into the plug-receiving cavity and wherein the portion of the ball that extends into the plug-receiving cavity is disposed in the groove to permit the plug to rotate relative to the plug receiver while opposing axial motion of the plug relative to the plug receiver.

49. The insert of claim 48 wherein the plug receiver comprises a cup and the plug and cup are received in a pocket in a cavity in the mold and the axially outer face of the plug comprises an indicia embossing surface for affecting the hardenable molding material by leaving an impression in the hardenable material received in the mold cavity when the hardenable material hardens.

50. The insert of claim 48 wherein 1) the mold cavity receives hardenable material therein from a source of the hardenable material, 2) the receiver comprises a cup that is received in a pocket in the mold, 3) the axially outer face of the plug has a channel therein, 4) wherein the plug i) is rotated to a first position that affects hardenable material by permitting flow of hardenable material from the source of the hardenable material through the channel toward the mold cavity, and ii) is rotated to a second position that affects the hardenable material by impeding flow of the hardenable material into the cavity in the mold.

51. An insert disposed in a mold that includes a mold cavity, the insert comprising:

(a) a plug having an end that is exposed to a hardenable molding material, the plug having a body and an axis about which it can rotate, the exposed end of the plug contoured so as to affect the hardenable molding material;

(b) a plug receiver disposed in the mold, the plug receiver having a plug-receiving cavity therein;

(c) (1) a groove in one of the plug and the plug receiver that encircles the plug and which includes (i) a single circumferential band portion that does not extend completely around the plug and that is transverse to the axis of plug rotation, and (ii) an entranceway portion disposed at an angle relative to the circumferential band portion of the groove and which connects with the circumferential band portion of the groove, and (2) a locator that extends from the other one of the plug and the receiver and that (i) is received in the entranceway portion of the groove when the plug is being inserted the plug receiver, (ii) is received in the circumferential band portion of the groove when the plug has been inserted into the plug receiver, and (iii) opposes removal of the plug from the plug receiver when the plug is received in the plug receiver and the locator is disposed in the circumferential band of the groove; and (d) a ball received in a bore in one of the plug and the plug receiver with a portion of the ball extending from the one of the plug and the plug receiver that is received in the groove when the plug is received in the plug receiver.

52. The insert of claim 51 wherein the groove extends no more than about one and one-half times around the periphery of the plug.

53. The insert of claim 51 wherein the circumferential band portion of the groove extends at least about 250° around the periphery of the plug.

54. The insert of claim 51 wherein the ball has a portion that extends into the plug-receiving cavity and wherein a portion of the ball that extends into the plug-receiving cavity is received in the groove to permit the plug to rotate relative to the plug receiver while limiting axial motion of the plug relative to the plug receiver.

55. The insert of claim 51 wherein the receiver comprises a cup that is removably attached to the mold by a fastener.

56. The insert of claim 51 wherein the receiver comprises a cup and the cup is removably attached to an ejector pin that operably cooperates with the mold.

57. The insert of claim 51 wherein the insert is carried by an ejector pin comprised of 1) bar stock that forms a barrel that is hardened and that is cut to length and 2) a head that has a larger diameter than the barrel that is attached to the barrel after the barrel has been hardened and cut to length.

* * * * *